US010936622B2

(12) United States Patent
Koorapati et al.

(10) Patent No.: US 10,936,622 B2
(45) Date of Patent: Mar. 2, 2021

(54) STORAGE INTERFACE FOR SYNCHRONIZING CONTENT

(71) Applicant: Dropbox, Inc., San Francisco, CA (US)

(72) Inventors: Nipunn Koorapati, San Francisco, CA (US); Daniel Horn, San Francisco, CA (US); Elmer Charles Jubb, IV, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 287 days.

(21) Appl. No.: 15/867,571

(22) Filed: Jan. 10, 2018

(65) Prior Publication Data

US 2019/0207929 A1 Jul. 4, 2019

Related U.S. Application Data

(60) Provisional application No. 62/611,473, filed on Dec. 28, 2017.

(51) Int. Cl.
*H04L 29/06* (2006.01)
*G06F 16/27* (2019.01)
(Continued)

(52) U.S. Cl.
CPC .............. *G06F 16/27* (2019.01); *G06F 1/04* (2013.01); *G06F 3/065* (2013.01); *G06F 3/067* (2013.01);
(Continued)

(58) Field of Classification Search
CPC ... H04L 63/10; H04L 63/101; H04L 63/0807; H04L 63/0876; H04L 63/102;
(Continued)

(56) References Cited

U.S. PATENT DOCUMENTS 5,335,346 A 8/1994 Fabbio et al.
5,745,750 A 4/1998 Porcaro
(Continued)

FOREIGN PATENT DOCUMENTS

AU 2008202290 B2 5/2010
CN 1255748 C 5/2006
(Continued)

OTHER PUBLICATIONS

Catherine C. Marshall et al., Supporting Research Collaboration through Bi-Level File Synchronization, Oct. 2012, ACM, pp. 165-174. (Year: 2012).*
(Continued)

*Primary Examiner* — Luu T Pham
*Assistant Examiner* — Fahimeh Mohammadi
(74) *Attorney, Agent, or Firm* — Polsinelli PC

(57) ABSTRACT

An interface of a content management system manages storage and access of content on the system. For example, after receiving, from a client, a request to download a content item, the interface determines whether the request includes a valid token. If so, the interface sends a content item request to a storage service, retrieves the content item, and sends the content item to the client. Otherwise, the interface sends an authorization request to an authorization service, an authentication request to an authentication service, and a content item request to the storage service. Based on the requests, the interface determines whether the content item is available in storage and whether the client is authorized to access the content item. When the content item is available in storage and the client is authorized to access the content item, the interface retrieves the content item and sends the content item to the client.

21 Claims, 15 Drawing Sheets

(51) Int. Cl.

| | |
|---|---|
| G06F 16/11 | (2019.01) |
| G06F 16/18 | (2019.01) |
| G06F 16/178 | (2019.01) |
| G06F 16/176 | (2019.01) |
| G06F 3/06 | (2006.01) |
| G06F 21/60 | (2013.01) |
| G06F 21/62 | (2013.01) |
| H04L 29/08 | (2006.01) |
| G06F 16/958 | (2019.01) |
| G06F 16/2455 | (2019.01) |
| G06F 16/951 | (2019.01) |
| G06F 16/172 | (2019.01) |
| G06F 1/04 | (2006.01) |
| G06F 9/54 | (2006.01) |
| G06F 11/14 | (2006.01) |
| G06F 12/14 | (2006.01) |
| G06F 21/10 | (2013.01) |
| H04L 9/32 | (2006.01) |
| G06F 16/23 | (2019.01) |
| G06F 16/22 | (2019.01) |
| G06F 16/182 | (2019.01) |
| G06F 16/185 | (2019.01) |
| G06F 16/16 | (2019.01) |
| G06F 16/13 | (2019.01) |
| G06F 16/174 | (2019.01) |
| G06F 16/14 | (2019.01) |
| G06F 16/907 | (2019.01) |
| G06F 16/17 | (2019.01) |
| G06F 16/901 | (2019.01) |
| G06F 16/955 | (2019.01) |

(52) U.S. Cl.
CPC .......... *G06F 3/0619* (2013.01); *G06F 3/0623* (2013.01); *G06F 3/0629* (2013.01); *G06F 3/0652* (2013.01); *G06F 9/547* (2013.01); *G06F 11/1469* (2013.01); *G06F 12/1466* (2013.01); *G06F 16/11* (2019.01); *G06F 16/113* (2019.01); *G06F 16/116* (2019.01); *G06F 16/119* (2019.01); *G06F 16/122* (2019.01); *G06F 16/125* (2019.01); *G06F 16/128* (2019.01); *G06F 16/13* (2019.01); *G06F 16/137* (2019.01); *G06F 16/148* (2019.01); *G06F 16/152* (2019.01); *G06F 16/156* (2019.01); *G06F 16/16* (2019.01); *G06F 16/162* (2019.01); *G06F 16/168* (2019.01); *G06F 16/172* (2019.01); *G06F 16/176* (2019.01); *G06F 16/178* (2019.01); *G06F 16/1734* (2019.01); *G06F 16/1744* (2019.01); *G06F 16/1767* (2019.01); *G06F 16/1787* (2019.01); *G06F 16/18* (2019.01); *G06F 16/182* (2019.01); *G06F 16/183* (2019.01); *G06F 16/184* (2019.01); *G06F 16/185* (2019.01); *G06F 16/1827* (2019.01); *G06F 16/1844* (2019.01); *G06F 16/2246* (2019.01); *G06F 16/2255* (2019.01); *G06F 16/2322* (2019.01); *G06F 16/2358* (2019.01); *G06F 16/2365* (2019.01); *G06F 16/2379* (2019.01); *G06F 16/24552* (2019.01); *G06F 16/275* (2019.01); *G06F 16/907* (2019.01); *G06F 16/9027* (2019.01); *G06F 16/951* (2019.01); *G06F 16/955* (2019.01); *G06F 16/958* (2019.01); *G06F 21/10* (2013.01); *G06F 21/604* (2013.01); *G06F 21/6218* (2013.01); *H04L 9/3213* (2013.01); *H04L 9/3247* (2013.01); *H04L 63/08* (2013.01); *H04L 63/0853* (2013.01); *H04L 63/10* (2013.01); *H04L 63/101* (2013.01); *H04L 63/102* (2013.01); *H04L 67/06* (2013.01); *H04L 67/1095* (2013.01); *H04L 67/1097* (2013.01); *G06F 2201/84* (2013.01); *G06F 2212/1052* (2013.01); *G06F 2221/2141* (2013.01); *H04L 67/306* (2013.01); *H04L 67/42* (2013.01)

(58) Field of Classification Search
CPC ..... H04L 63/08; H04L 63/0853; G06F 21/10; G06F 21/604; G06F 21/6218
See application file for complete search history.

(56) References Cited

U.S. PATENT DOCUMENTS

| | | |
|---|---|---|
| 5,778,389 A | 7/1998 | Pruett et al. |
| 5,802,508 A | 9/1998 | Morgenstern |
| 5,956,715 A | 9/1999 | Glasser et al. |
| 6,269,371 B1 | 7/2001 | Ohnishi |
| 6,408,298 B1 | 6/2002 | Van et al. |
| 6,421,684 B1 | 7/2002 | Cabrera et al. |
| 6,427,123 B1 | 7/2002 | Sedlar |
| 6,560,655 B1 | 5/2003 | Grambihler et al. |
| 6,574,665 B1 | 6/2003 | Khotimsky et al. |
| 6,618,735 B1 | 9/2003 | Krishnaswami et al. |
| 6,944,623 B2 | 9/2005 | Kim et al. |
| 7,024,392 B2 | 4/2006 | Stefik et al. |
| 7,051,039 B1 | 5/2006 | Murthy et al. |
| 7,080,041 B2 | 7/2006 | Nagel et al. |
| 7,275,177 B2 | 9/2007 | Armangau et al. |
| 7,313,598 B1 | 12/2007 | Sheth et al. |
| 7,487,228 B1 | 2/2009 | Preslan et al. |
| 7,526,575 B2 | 4/2009 | Rabbers ............... G06F 16/275 709/248 |
| 7,529,931 B2 | 5/2009 | Vasishth et al. |
| 7,567,991 B2 | 7/2009 | Armangau et al. |
| 7,606,876 B2 | 10/2009 | Graves et al. |
| 7,634,482 B2 | 12/2009 | Mukherjee et al. |
| 7,634,514 B2 | 12/2009 | Langan et al. |
| 7,657,769 B2 | 2/2010 | Marcy et al. |
| 7,660,809 B2 | 2/2010 | Cortright et al. |
| 7,685,206 B1 * | 3/2010 | Mathew ............... H04L 63/105 707/785 |
| 7,734,690 B2 | 6/2010 | Moromisato et al. |
| 7,761,497 B1 | 7/2010 | O'Connell, Jr. et al. |
| 7,805,469 B1 | 9/2010 | Nagaralu et al. |
| 7,809,828 B2 | 10/2010 | Burnett et al. |
| 7,886,016 B1 | 2/2011 | Tormasov et al. |
| 7,895,158 B2 | 2/2011 | Bosloy et al. |
| 7,917,494 B2 | 3/2011 | Mueller et al. |
| 7,925,631 B1 | 4/2011 | Thillai et al. |
| 7,962,950 B2 | 6/2011 | Choo et al. |
| 8,015,204 B2 | 9/2011 | Kaler et al. |
| 8,069,226 B2 | 11/2011 | Momchilov et al. |
| 8,099,452 B2 | 1/2012 | Chkodrov et al. |
| 8,117,151 B2 | 2/2012 | Nakatani et al. |
| 8,156,151 B2 | 4/2012 | Sidman et al. |
| 8,180,747 B2 | 5/2012 | Marinkovic et al. |
| 8,190,741 B2 | 5/2012 | Wong et al. |
| 8,249,885 B2 | 8/2012 | Berkowitz et al. |
| 8,250,397 B2 | 8/2012 | Marcy et al. |
| 8,260,742 B2 | 9/2012 | Cognigni et al. |
| 8,301,994 B1 | 10/2012 | Shah et al. |
| 8,312,242 B2 | 11/2012 | Casper et al. |
| 8,326,874 B2 | 12/2012 | Wright et al. |
| 8,359,467 B2 | 1/2013 | Subramanian et al. |
| 8,417,676 B2 | 4/2013 | Petri et al. |
| 8,548,992 B2 | 10/2013 | Abramoff et al. |
| 8,554,800 B2 | 10/2013 | Goldentouch et al. |
| 8,589,349 B2 | 11/2013 | Grant et al. |
| 8,661,070 B2 | 2/2014 | Goldsmith et al. |
| 8,667,034 B1 | 3/2014 | Simon et al. |
| 8,694,564 B2 | 4/2014 | Guarraci et al. |
| 8,700,670 B2 | 4/2014 | Marathe et al. |

(56) References Cited

U.S. PATENT DOCUMENTS

| | | |
|---|---|---|
| 8,706,701 B1 | 4/2014 | Stefanov et al. |
| 8,818,951 B1 | 8/2014 | Muntz et al. |
| 8,862,644 B2 | 10/2014 | Lyle et al. |
| 8,880,474 B2 | 11/2014 | Mason et al. |
| 8,904,503 B2 | 12/2014 | Agbabian et al. |
| 8,990,924 B2 | 3/2015 | Chow |
| 8,996,884 B2 | 3/2015 | Hartley et al. |
| 9,002,805 B1 | 4/2015 | Barber et al. |
| 9,087,215 B2 | 7/2015 | Lafever et al. |
| 9,129,088 B1 | 9/2015 | Baschy et al. |
| 9,152,466 B2 | 10/2015 | Dictos et al. |
| 9,210,116 B2 | 12/2015 | Jeng et al. |
| 9,218,429 B2 | 12/2015 | Levy et al. |
| 9,231,988 B2 | 1/2016 | Holt et al. |
| 9,239,841 B2 | 1/2016 | Arnaudov et al. |
| 9,251,235 B1 | 2/2016 | Hurst et al. |
| 9,294,485 B2 | 3/2016 | Allain et al. |
| 9,298,384 B2 | 3/2016 | Kang et al. |
| 9,300,609 B1 | 3/2016 | Beausoleil et al. |
| 9,310,981 B2 | 4/2016 | Lynch et al. |
| 9,311,324 B2 | 4/2016 | Irizarry, Jr. et al. |
| 9,325,571 B1 | 4/2016 | Chen et al. |
| 9,330,106 B2 | 5/2016 | Piasecki et al. |
| 9,336,219 B2 | 5/2016 | Makkar et al. |
| 9,361,473 B2 | 6/2016 | Chou Fritz et al. |
| 9,413,708 B1 | 8/2016 | Michael et al. |
| 9,424,437 B1 | 8/2016 | Ancin et al. |
| 9,426,216 B2 | 8/2016 | Subramani et al. |
| 9,430,669 B2 | 8/2016 | Staley et al. |
| 9,432,457 B2 | 8/2016 | Marano et al. |
| 9,444,869 B2 | 9/2016 | Jellison, Jr. et al. |
| 9,448,893 B1 | 9/2016 | Whitehead et al. |
| 9,449,082 B2 | 9/2016 | Leonard et al. |
| 9,449,182 B1 | 9/2016 | Dang et al. |
| 9,454,534 B2 | 9/2016 | Thomas et al. |
| 9,471,807 B1 | 10/2016 | Chakraborty et al. |
| 9,477,673 B2 | 10/2016 | Dwan et al. |
| 9,479,567 B1 | 10/2016 | Koorapati et al. |
| 9,479,578 B1 | 10/2016 | Swanson et al. |
| 9,483,491 B2 | 11/2016 | Wijayaratne et al. |
| 9,495,478 B2 | 11/2016 | Hendrickson et al. |
| 9,501,490 B2 | 11/2016 | Evans et al. |
| 9,507,795 B2 | 11/2016 | Dorman et al. |
| 9,529,818 B2 | 12/2016 | Catmull et al. |
| 9,542,404 B2 | 1/2017 | Moore et al. |
| 9,547,559 B2 | 1/2017 | Whitehead et al. |
| 9,552,363 B2 | 1/2017 | Novak et al. |
| 9,558,202 B2 | 1/2017 | Lockhart et al. |
| 9,563,638 B2 | 2/2017 | Newhouse et al. |
| 9,565,227 B1 | 2/2017 | Helter et al. |
| 9,589,131 B2 | 3/2017 | Austin et al. |
| 9,596,246 B2 | 3/2017 | Peddada et al. |
| 9,614,826 B1 | 4/2017 | Mccorkendale |
| 9,632,528 B2 | 4/2017 | Miyashita et al. |
| 9,633,037 B2 | 4/2017 | Smith et al. |
| 9,648,088 B1 | 5/2017 | Pande et al. |
| 9,652,490 B2 | 5/2017 | Belanger et al. |
| 9,652,741 B2 | 5/2017 | Goldberg et al. |
| 9,672,261 B2 | 6/2017 | Holmes-Higgin et al. |
| 9,703,801 B2 | 7/2017 | Melahn et al. |
| 9,710,535 B2 | 7/2017 | Aizman et al. |
| 9,716,753 B2 | 7/2017 | Piyush et al. |
| 9,720,926 B2 | 8/2017 | Aron et al. |
| 9,720,947 B2 | 8/2017 | Aron et al. |
| 9,727,394 B2 | 8/2017 | Xun et al. |
| 9,747,164 B1 | 8/2017 | Auchmoody et al. |
| 9,747,297 B2 | 8/2017 | Penangwala et al. |
| 9,754,119 B1 | 9/2017 | Kilday et al. |
| 9,767,106 B1 | 9/2017 | Duggal et al. |
| 9,773,051 B2 | 9/2017 | Smith et al. |
| 9,805,050 B2 | 10/2017 | Smith et al. |
| 9,805,054 B2 | 10/2017 | Davis et al. |
| 9,805,106 B2 | 10/2017 | McErlean et al. |
| 9,817,987 B2 | 11/2017 | Mityagin et al. |
| 9,824,090 B2 | 11/2017 | Hayrapetian et al. |
| 9,830,345 B1 | 11/2017 | Baars et al. |
| 9,838,424 B2 | 12/2017 | Brady et al. |
| 9,953,036 B2 | 4/2018 | Mackenzie et al. |
| 10,013,440 B1 | 7/2018 | Gupta et al. |
| 10,037,339 B1 | 7/2018 | Kleinpeter et al. |
| 10,235,378 B1 | 3/2019 | Mamidi et al. |
| 10,324,903 B1 | 6/2019 | Goldberg et al. |
| 10,380,076 B2 | 8/2019 | Wijayaratne et al. |
| 2003/0145020 A1 | 7/2003 | Ngo et al. |
| 2003/0196119 A1* | 10/2003 | Raley ................. G06F 21/6218 726/7 |
| 2004/0002990 A1 | 1/2004 | Sander et al. |
| 2004/0098418 A1 | 5/2004 | Hein et al. |
| 2004/0255048 A1 | 12/2004 | Lev Ran et al. |
| 2005/0125411 A1 | 6/2005 | Kilian et al. |
| 2005/0144308 A1 | 6/2005 | Harashima et al. |
| 2005/0149450 A1 | 7/2005 | Stefik et al. |
| 2005/0198385 A1 | 9/2005 | Aust et al. |
| 2005/0256861 A1 | 11/2005 | Wong et al. |
| 2005/0289446 A1 | 12/2005 | Moncsko et al. |
| 2006/0070114 A1* | 3/2006 | Wood ..................... G06F 21/31 726/2 |
| 2006/0136513 A1 | 6/2006 | Ngo et al. |
| 2006/0155776 A1 | 7/2006 | Aust et al. |
| 2006/0184720 A1 | 8/2006 | Sinclair et al. |
| 2006/0253501 A1 | 11/2006 | Langan et al. |
| 2007/0016650 A1 | 1/2007 | Gilbert et al. |
| 2007/0022091 A1 | 1/2007 | Styles et al. |
| 2007/0067349 A1 | 3/2007 | Jhaveri et al. |
| 2007/0088764 A1 | 4/2007 | Yoon et al. |
| 2007/0136391 A1 | 6/2007 | Anzai et al. |
| 2007/0185852 A1 | 8/2007 | Erofeev |
| 2007/0198540 A1 | 8/2007 | Kohl et al. |
| 2007/0208715 A1 | 9/2007 | Muehlbauer et al. |
| 2007/0208763 A1 | 9/2007 | Muehlbauer et al. |
| 2007/0208948 A1 | 9/2007 | Costa-Requena et al. |
| 2007/0234398 A1 | 10/2007 | Muehlbauer et al. |
| 2007/0282914 A1 | 12/2007 | Sivapragasam et al. |
| 2007/0283050 A1 | 12/2007 | Savage |
| 2007/0283403 A1* | 12/2007 | Eklund, II ............... G09B 5/06 725/117 |
| 2008/0104277 A1 | 5/2008 | Tian |
| 2008/0120129 A1 | 5/2008 | Seubert et al. |
| 2008/0168183 A1 | 7/2008 | Marcy et al. |
| 2009/0150569 A1 | 6/2009 | Kumar et al. |
| 2009/0182778 A1 | 7/2009 | Tormasov |
| 2009/0183117 A1 | 7/2009 | Chang |
| 2009/0198719 A1 | 8/2009 | Dewitt |
| 2009/0228511 A1 | 9/2009 | Atkin et al. |
| 2009/0271412 A1 | 10/2009 | Lacapra et al. |
| 2009/0292640 A1 | 11/2009 | Heatherly |
| 2010/0058462 A1 | 3/2010 | Chow |
| 2010/0106687 A1 | 4/2010 | Marcy et al. |
| 2011/0014985 A1 | 1/2011 | Park et al. |
| 2011/0066668 A1* | 3/2011 | Guarraci ................. G06F 16/27 707/831 |
| 2011/0072143 A1 | 3/2011 | Kuo et al. |
| 2011/0082879 A1 | 4/2011 | Hazlewood et al. |
| 2011/0126296 A1* | 5/2011 | Moore ................. H04L 63/0807 726/28 |
| 2011/0197196 A1 | 8/2011 | Felton et al. |
| 2011/0248821 A1 | 10/2011 | Merten |
| 2011/0271084 A1 | 11/2011 | Moue et al. |
| 2012/0011098 A1 | 1/2012 | Yamada |
| 2012/0079606 A1 | 3/2012 | Evans et al. |
| 2012/0102539 A1 | 4/2012 | Robb et al. |
| 2012/0254123 A1 | 10/2012 | Ferguson et al. |
| 2012/0254505 A1 | 10/2012 | Chishtie et al. |
| 2012/0278334 A1 | 11/2012 | Abjanic |
| 2013/0013560 A1 | 1/2013 | Goldberg et al. |
| 2013/0014023 A1 | 1/2013 | Lee et al. |
| 2013/0067542 A1 | 3/2013 | Gonsalves et al. |
| 2013/0080785 A1* | 3/2013 | Ruhlen ................. H04L 67/1002 713/176 |
| 2013/0133051 A1 | 5/2013 | Riemers |
| 2013/0138608 A1 | 5/2013 | Smith |
| 2013/0144834 A1 | 6/2013 | Lloyd et al. |
| 2013/0179480 A1 | 7/2013 | Agarwal et al. |
| 2013/0191339 A1 | 7/2013 | Haden et al. |

(56) References Cited

U.S. PATENT DOCUMENTS

| | | |
|---|---|---|
| 2013/0246527 A1 | 9/2013 | Viera et al. |
| 2013/0254777 A1 | 9/2013 | Branson et al. |
| 2013/0258842 A1 | 10/2013 | Mizutani et al. |
| 2013/0268480 A1 | 10/2013 | Dorman |
| 2013/0268559 A1 | 10/2013 | Reeves |
| 2013/0282658 A1 | 10/2013 | Besen et al. |
| 2013/0282785 A1 | 10/2013 | Besen et al. |
| 2013/0290323 A1 | 10/2013 | Saib |
| 2013/0304694 A1 | 11/2013 | Barreto et al. |
| 2013/0321306 A1 | 12/2013 | Bauermeister et al. |
| 2014/0047261 A1 | 2/2014 | Patiejunas et al. |
| 2014/0059002 A1 | 2/2014 | Lockhart et al. |
| 2014/0082145 A1 | 3/2014 | Lacapra |
| 2014/0136635 A1* | 5/2014 | Jeng ............ H04L 51/22 709/206 |
| 2014/0143543 A1* | 5/2014 | Aikas ............ G06F 21/6209 713/168 |
| 2014/0173694 A1 | 6/2014 | Kranz et al. |
| 2014/0181021 A1 | 6/2014 | Montulli et al. |
| 2014/0181033 A1 | 6/2014 | Pawar et al. |
| 2014/0181053 A1 | 6/2014 | Belanger et al. |
| 2014/0181579 A1 | 6/2014 | Whitehead et al. |
| 2014/0188798 A1 | 7/2014 | Mackenzie ............ G06F 16/275 707/625 |
| 2014/0189051 A1 | 7/2014 | Hunter |
| 2014/0189118 A1 | 7/2014 | Hunter |
| 2014/0189355 A1 | 7/2014 | Hunter ............ H04L 63/0428 713/171 |
| 2014/0195485 A1 | 7/2014 | Dorman |
| 2014/0201138 A1 | 7/2014 | Dorman et al. |
| 2014/0201145 A1 | 7/2014 | Dorman et al. |
| 2014/0250066 A1 | 9/2014 | Calkowski et al. |
| 2014/0258350 A1 | 9/2014 | Duval et al. |
| 2014/0258418 A1 | 9/2014 | Subramani et al. |
| 2014/0282851 A1 | 9/2014 | Miller et al. |
| 2014/0289195 A1 | 9/2014 | Chan et al. |
| 2014/0297734 A1 | 10/2014 | Lacapra et al. |
| 2014/0310175 A1 | 10/2014 | Coronel et al. |
| 2014/0372376 A1 | 12/2014 | Smith et al. |
| 2014/0379647 A1 | 12/2014 | Smith et al. |
| 2015/0012616 A1* | 1/2015 | Pearl ............ H04L 67/1095 709/219 |
| 2015/0026222 A1 | 1/2015 | Litzenberger et al. |
| 2015/0026597 A1 | 1/2015 | Gadamsetty et al. |
| 2015/0026604 A1 | 1/2015 | Mulukuri et al. |
| 2015/0026751 A1 | 1/2015 | Yokoi |
| 2015/0058932 A1 | 2/2015 | Faitelson et al. |
| 2015/0088817 A1 | 3/2015 | Dwan et al. |
| 2015/0100546 A1 | 4/2015 | Eberlein et al. |
| 2015/0100547 A1 | 4/2015 | Holmes-Higgin et al. |
| 2015/0100705 A1 | 4/2015 | Abe et al. |
| 2015/0134600 A1 | 5/2015 | Eisner et al. |
| 2015/0154418 A1 | 6/2015 | Redberg et al. |
| 2015/0163206 A1 | 6/2015 | Mccarthy et al. |
| 2015/0172283 A1* | 6/2015 | Omnes ............ H04W 12/08 726/9 |
| 2015/0172412 A1 | 6/2015 | Escriva et al. |
| 2015/0186668 A1 | 7/2015 | Whaley ............ G06F 16/16 713/156 |
| 2015/0193347 A1 | 7/2015 | Kluesing et al. |
| 2015/0207844 A1* | 7/2015 | Tataroiu ............ H04L 67/02 709/219 |
| 2015/0220917 A1* | 8/2015 | Aabye ............ G06Q 20/3278 705/64 |
| 2015/0222431 A1 | 8/2015 | Guido Van Rossum |
| 2015/0222580 A1 | 8/2015 | Grue et al. |
| 2015/0222615 A1 | 8/2015 | Allain et al. |
| 2015/0242521 A1 | 8/2015 | Hunter et al. |
| 2015/0244692 A1* | 8/2015 | Liu ............ H04W 12/04 713/168 |
| 2015/0244795 A1 | 8/2015 | Cantwell et al. |
| 2015/0248384 A1 | 9/2015 | Luo et al. |
| 2015/0277802 A1 | 10/2015 | Oikarinen et al. |
| 2015/0277969 A1 | 10/2015 | Strauss et al. |
| 2015/0278024 A1 | 10/2015 | Barman et al. |
| 2015/0278397 A1 | 10/2015 | Hendrickson et al. |
| 2015/0280959 A1 | 10/2015 | Vincent et al. |
| 2015/0281360 A1 | 10/2015 | Lacapra et al. |
| 2015/0296012 A1 | 10/2015 | Piyush et al. |
| 2015/0310035 A1 | 10/2015 | Godman et al. |
| 2015/0318941 A1 | 11/2015 | Zheng et al. |
| 2015/0356111 A1 | 12/2015 | Kalsi et al. |
| 2015/0358408 A1 | 12/2015 | Fukatani et al. |
| 2015/0370483 A1 | 12/2015 | Schoebel-Theuer et al. |
| 2015/0370825 A1 | 12/2015 | Outcalt ............ G06F 16/178 707/608 |
| 2016/0028796 A1 | 1/2016 | Garcia et al. |
| 2016/0034508 A1 | 2/2016 | Aron et al. |
| 2016/0036822 A1 | 2/2016 | Kim et al. |
| 2016/0050177 A1 | 2/2016 | Cue et al. |
| 2016/0055021 A1 | 2/2016 | Beveridge et al. |
| 2016/0065672 A1 | 3/2016 | Savage et al. |
| 2016/0085769 A1 | 3/2016 | Penangwala et al. |
| 2016/0092312 A1 | 3/2016 | Dornquast et al. |
| 2016/0103750 A1 | 4/2016 | Cooper et al. |
| 2016/0110374 A1 | 4/2016 | Wetherall et al. |
| 2016/0112508 A1 | 4/2016 | Sher |
| 2016/0140197 A1 | 5/2016 | Gast et al. |
| 2016/0182494 A1 | 6/2016 | Lissounov et al. |
| 2016/0188465 A1 | 6/2016 | Almasi et al. |
| 2016/0188628 A1 | 6/2016 | Hartman et al. |
| 2016/0205100 A1* | 7/2016 | Brannon ............ H04L 63/0823 726/4 |
| 2016/0210238 A1 | 7/2016 | Frank et al. |
| 2016/0224989 A1 | 8/2016 | Lissounov et al. |
| 2016/0285890 A1 | 9/2016 | Beausoleil et al. |
| 2016/0291856 A1 | 10/2016 | Von Muhlen et al. |
| 2016/0292179 A1 | 10/2016 | Von Muhlen et al. |
| 2016/0292443 A1 | 10/2016 | Von Muhlen et al. |
| 2016/0294916 A1 | 10/2016 | Daher et al. |
| 2016/0301619 A1* | 10/2016 | Bashir ............ H04L 67/1097 |
| 2016/0321287 A1 | 11/2016 | Luthra et al. |
| 2016/0321293 A1 | 11/2016 | Auer |
| 2016/0323358 A1 | 11/2016 | Malhotra et al. |
| 2016/0334967 A1 | 11/2016 | Rottler et al. |
| 2016/0335278 A1 | 11/2016 | Tabaaloute et al. |
| 2016/0337356 A1 | 11/2016 | Simon et al. |
| 2016/0342479 A1 | 11/2016 | Chen et al. |
| 2016/0349999 A1 | 12/2016 | Adler et al. |
| 2016/0352752 A1 | 12/2016 | Bush et al. |
| 2016/0353447 A1 | 12/2016 | White et al. |
| 2016/0357720 A1 | 12/2016 | Thimbleby |
| 2016/0366118 A1* | 12/2016 | Wang ............ H04L 63/108 |
| 2016/0371296 A1 | 12/2016 | Passey et al. |
| 2017/0005974 A1 | 1/2017 | Wheeler et al. |
| 2017/0006097 A1 | 1/2017 | Johnson et al. |
| 2017/0026379 A1* | 1/2017 | Lu ............ H04L 63/102 |
| 2017/0039216 A1 | 2/2017 | Fan et al. |
| 2017/0052717 A1 | 2/2017 | Rawat et al. |
| 2017/0075920 A1 | 3/2017 | Mckay et al. |
| 2017/0075921 A1 | 3/2017 | Benton et al. |
| 2017/0078383 A1 | 3/2017 | Murstein et al. |
| 2017/0078384 A1 | 3/2017 | Trandafir et al. |
| 2017/0109385 A1 | 4/2017 | Aronovich et al. |
| 2017/0123931 A1 | 5/2017 | Aizman et al. |
| 2017/0124111 A1 | 5/2017 | Sharma et al. |
| 2017/0131934 A1 | 5/2017 | Kaczmarczyk et al. |
| 2017/0149885 A1 | 5/2017 | Kaplan et al. |
| 2017/0177613 A1 | 6/2017 | Sharma ............ G06F 21/45 |
| 2017/0185687 A1 | 6/2017 | Pai et al. |
| 2017/0192656 A1 | 7/2017 | Pedrick et al. |
| 2017/0192856 A1 | 7/2017 | Chin et al. |
| 2017/0192998 A1 | 7/2017 | Sergeev et al. |
| 2017/0193002 A1 | 7/2017 | Shvachko et al. |
| 2017/0193040 A1 | 7/2017 | Agrawal et al. |
| 2017/0193448 A1 | 7/2017 | Piyush et al. |
| 2017/0195457 A1* | 7/2017 | Smith, II ............ H04L 63/166 |
| 2017/0220596 A1 | 8/2017 | Smith et al. |
| 2017/0230702 A1 | 8/2017 | Sarosi et al. |
| 2017/0235759 A1 | 8/2017 | Altaparmakov et al. |
| 2017/0270136 A1 | 9/2017 | Chen ............ G06F 16/178 |
| 2017/0270306 A1* | 9/2017 | Dorwin ............ H04L 9/0631 |
| 2017/0289210 A1 | 10/2017 | Pai et al. |

(56) References Cited

U.S. PATENT DOCUMENTS

| | | |
|---|---|---|
| 2017/0300505 A1 | 10/2017 | Belmanu Sadananda et al. |
| 2017/0302737 A1 | 10/2017 | Piyush et al. |
| 2017/0308443 A1 | 10/2017 | Lai et al. |
| 2017/0308565 A1 | 10/2017 | Broil et al. |
| 2017/0308598 A1 | 10/2017 | Goldberg et al. |
| 2017/0308599 A1 | 10/2017 | Newhouse et al. |
| 2017/0308681 A1 | 10/2017 | Gould et al. |
| 2017/0314898 A1* | 11/2017 | Syverson ............... F42B 6/04 |
| 2017/0331893 A1 | 11/2017 | Crofton et al. |
| 2017/0351701 A1 | 12/2017 | Aron et al. |
| 2017/0357663 A1 | 12/2017 | Giampaolo et al. |
| 2018/0004442 A1 | 1/2018 | Hnanicek et al. |
| 2018/0084045 A1 | 3/2018 | Nichols et al. |
| 2018/0089349 A1 | 3/2018 | Rezgui et al. |
| 2018/0144263 A1 | 5/2018 | Saxena et al. |
| 2018/0150477 A1 | 5/2018 | Jewell et al. |
| 2018/0176082 A1 | 6/2018 | Katz et al. |
| 2018/0176093 A1 | 6/2018 | Katz et al. |
| 2018/0176120 A1 | 6/2018 | Katz et al. |
| 2018/0181549 A1 | 6/2018 | Hileman et al. |
| 2018/0196643 A1 | 7/2018 | Dolby et al. |
| 2018/0246946 A1 | 8/2018 | Sadhwani |
| 2018/0364950 A1 | 12/2018 | Spillane et al. |
| 2018/0365236 A1 | 12/2018 | Wang et al. |
| 2019/0005139 A1 | 1/2019 | Ford et al. |
| 2019/0034507 A1 | 1/2019 | Duttagupta et al. |
| 2019/0050833 A1 | 2/2019 | Hu et al. |
| 2019/0102370 A1 | 4/2019 | Nelson et al. |
| 2019/0114427 A1 | 4/2019 | Suryanarayana et al. |
| 2019/0179714 A1 | 6/2019 | Karthikeyan et al. |
| 2019/0205423 A1 | 7/2019 | Haven et al. |
| 2019/0205424 A1 | 7/2019 | Jubb, IV |
| 2019/0205425 A1 | 7/2019 | Goldberg et al. |
| 2019/0332231 A1 | 10/2019 | Rogers et al. |
| 2019/0332688 A1 | 10/2019 | Valentine et al. |
| 2019/0361793 A1 | 11/2019 | Goldberg |
| 2020/0249877 A1 | 8/2020 | Mcilroy et al. |

FOREIGN PATENT DOCUMENTS

| | | |
|---|---|---|
| CN | 106897352 A | 6/2017 |
| CN | 106941504 A | 7/2017 |
| EP | 2757491 A1 | 7/2014 |
| EP | 2911068 A1 | 8/2015 |
| GB | 2399663 A | 9/2004 |
| GB | 2494047 | 2/2013 |
| WO | WO-2009126941 A1 | 10/2009 |
| WO | WO-2014080547 A1 | 5/2014 |
| WO | WO-2015055035 A1 | 4/2015 |

OTHER PUBLICATIONS

Vishal Kher et al. Securing Distributed Storage: Challenges, Techniques, and Systems, Nov. 2005, ACM, pp. 9-25. (Year: 2005).*

Haiyang Wang et al., On the Impact of Virtualization on Dropbox-like Cloud File Storage/Synchronization Services, Jun. 4-5, 2012, IEEE, pp. 1-9. (Year: 2012).*

Johannes K. Chiang et al., Authentication, Authorization and File Synchronization on Hybrid Cloud, Jul. 2-5, 2013, IEEE, pp. 116-123. (Year: 2013).*

Final Office Action from U.S. Appl. No. 15/863,748, dated Dec. 20, 2019, 19 pages.

Non-Final Office Action from U.S. Appl. No. 15/858,410, dated Nov. 29, 2019, 14 pages.

Non-Final Office Action from U.S. Appl. No. 15/858,430, dated Nov. 26, 2019, 10 pages.

Non-Final Office Action from U.S. Appl. No. 15/863,751, dated Nov. 6, 2019, 17 pages.

Non-Final Office Action from U.S. Appl. No. 15/867,496, dated Nov. 13, 2019, 12 pages.

Non-Final Office Action from U.S. Appl. No. 15/868,505, dated Nov. 14, 2019, 7 pages.

Non-Final Office Action from U.S. Appl. No. 15/870,179, dated Oct. 7, 2019, 6 pages.

Notice of Allowance from U.S. Appl. No. 15/868,489, dated Dec. 27, 2019, 2 pages.

Notice of Allowance from U.S. Appl. No. 15/873,693, dated Dec. 26, 2019, 9 pages.

Notice of Allowance from U.S. Appl. No. 15/873,693, dated Oct. 29, 2019, 10 pages.

Requirement for Restriction/Election from U.S. Appl. No. 15/858,207, dated Sep. 26, 2019, 6 pages.

Requirement for Restriction/Election from U.S. Appl. No. 15/858,410, dated Sep. 19, 2019, 7 pages.

GLADINET Inc., "CentreStack," Boca Raton, FL, May 30, 2015, Available online at https://webcache.googleusercontent.com/search?q=cache:R3ogLpu7xJYJ and https://www.gladinet.com/library/admin/index.htm+&cd=1&hl=en&ct=clnk&gl=us, visited on Feb. 8, 2018.

International Search Report and Written Opinion for PCT Application PCT/US2018/064659 dated Mar. 19, 2019, 13 pages.

International Search Report and Written Opinion for PCT Application PCT/US2018/064670 dated Mar. 14, 2019, 13 pages.

International Search Report and Written Opinion for PCT Application PCT/US2018/064675 dated Mar. 13, 2019, 12 pages.

International Search Report and Written Opinion for PCT Application PCT/US2018/065091 dated Mar. 21, 2019, 16 pages.

International Search Report and Written Opinion for PCT Application PCT/US2018/065100 dated Mar. 19, 2019, 11 pages.

International Search Report and Written Opinion for PCT Application PCT/US2018/065352 dated Mar. 19, 2019, 13 pages.

International Search Report and Written Opinion for PCT Application PCT/US2018/065940 dated Mar. 14, 2019, 14 pages.

International Search Report and Written Opinion for PCT Application PCT/US2018/066193 dated Mar. 14, 2019, 12 pages.

Liu G., et al., "Source Code Revision History Visualization Tools: Do They Work and What Would it Take to Put Them to Work?," 2014 IEEE Access, Practical Innovations 1 Open Solutions, May 6, 2014, vol. 2, pp. 404-426.

Niazi S., et al., "HopsFS: Scaling Hierarchical File System Metadata Using NewSQL Databases," The 15th USENIX Conference on File and Storage Technologies (FAST 17), Feb. 22, 2017, 15 pages.

Pollack K.T., et al., "Efficient Access Control for Distributed Hierarchical File Systems," Source: Proceedings—Twenty-second IEEE/Thirteenth NASA Goddard Conference on Mass Storage Systems and Technologies, IEEE/NASA MSST2005, Apr. 11, 2005-Apr. 14, 2005, pp. 101-108.

Cobena G., et al., "Detecting Changes in XML Documents," Proceedings of the 18th International Conference on Data Engineering, Jan. 1, 2002, pp. 41-52.

International Search Report and Written Opinion for PCT Application PCT/US2018/065097 dated Mar. 19, 2019, 14 pages International Search Report and Written Opinion for PCT Application PCT/US2018/065347 dated Apr. 2, 2019, 16 pages.

Lindholm T., et al., "A Hybrid Approach to Optimistic File System Directory Tree Synchronization," MobiDE 2005, Proceedings of 4th ACM International Workshop on Data Engineering for Wireless and Mobile Access, Jun. 12, 2005, pp. 49-56.

Lindholm T., "XML Three-way Merge as a Reconciliation Engine for Mobile Data," Proceedings of the 3rd ACM International Workshop on Data Engineering for Wireless and Mobile Access, MobiDE'03, Sep. 19, 2003, pp. 93-97.

Phan R.C.W., et al., "Security Considerations for Incremental Hash Functions Based on Pair Block Chaining," Computers & Security, vol. 25 (2), Jan. 30, 2006, pp. 131-136.

Wang Y., et al., "X-Diff: An Effective Change Detection Algorithm for XML Documents," 2003 IEEE, Proceedings of the 19th International Conference on Data Engineering (ICDE'03), Mar. 5-8, 2003, pp. 519-530.

Swathy V., et al., "Providing Advanced Security Mechanism for Scalable Data Sharing in Cloud Storage," 2016 International Conference on Inventive Computation Technologies (ICICT), 2016, vol. 3, pp. 1-6.

Uploaded by Neeraj Singh, "Distributed System Answer Key," retrieved from https://www.scribd.com/doc/80052663/Distributed-System-Answer-Key, 129 pages.

(56) References Cited

OTHER PUBLICATIONS

Uppoor S., et al., "Cloud-based Synchronization of Distributed File System Hierarchies," 2010 IEEE International Conference on Cluster Computing Workshops and Posters (Cluster Workshops), Sep. 20, 2010, pp. 1-4.
Final Office Action from U.S. Appl. No. 15/863,751, dated Mar. 24, 2020, 16 pages.
Non-Final Office Action from U.S. Appl. No. 15/858,146, dated Apr. 1, 2020, 23 pages.
Non-Final Office Action from U.S. Appl. No. 15/863,815, dated Mar. 18, 2020, 17 pages.
Non-Final Office Action from U.S. Appl. No. 15/867,486, dated Apr. 3, 2020, 36 pages.
Non-Final Office Action from U.S. Appl. No. 15/867,612, dated Apr. 3, 2020, 14 pages.
Notice of Allowance from U.S. Appl. No. 15/863,819, dated Apr. 7, 2020, 8 pages.
Non-Final Office Action for U.S. Appl. No. 15/868,511 dated Feb. 5, 2020, 11 pages.
Non-Final Office Action from U.S. Appl. No. 15/858,110, dated Feb. 24, 2020, 13 pages.
Notice of Allowance from U.S. Appl. No. 15/863,819, dated Mar. 6, 2020, 10 pages.
Notice of Allowance from U.S. Appl. No. 15/868,489, dated Feb. 20, 2020, 2 pages.
Notice of Allowance from U.S. Appl. No. 15/870,221, dated Feb. 25, 2020, 19 pages.
Advisory Action from U.S. Appl. No. 15/863,748, dated Apr. 15, 2020, 3 pages.
Final Office Action from U.S. Appl. No. 15/867,496, dated Apr. 10, 2020, 14 pages.
Final Office Action from U.S. Appl. No. 15/870,179, dated Apr. 16, 2020, 6 pages.
Non-Final Office Action from U.S. Appl. No. 15/868,505, dated Apr. 13, 2020, 12 pages.
Notice of Allowance from U.S. Appl. No. 15/870,221, dated Apr. 10, 2020, 19 pages.
Final Office Action from U.S. Appl. No. 15/858,125, dated Jun. 26, 2020, 15 pages.
Final Office Action from U.S. Appl. No. 15/858,207, dated Jul. 2, 2020, 16 pages.
Final Office Action from U.S. Appl. No. 15/858,430, dated Jun. 12, 2020, 11 pages.
Kappes G., et al., "Virtualization-aware Access Control for Multitenant Filesystems," MSST 2014, Jun. 2-6, 2014, pp. 1-6.
Mell P M., et al., "Linear Time Algorithms to Restrict Insider Access using Multi-Policy Access Control Systems," Apr. 2013, retrieved from https://www.nist.gov/publications/linear-time-algorithms-restrict-insider-access-using-multi-policy-access-control, on Dec. 31, 2019, 2 pages.
Non-Final Office Action from U.S. Appl. No. 15/857,713, dated Jan. 7, 2020, 16 pages.
Non-Final Office Action from U.S. Appl. No. 15/858,192, dated Jun. 12, 2020, 13 pages.
Non-Final Office Action from U.S. Appl. No. 15/863,751, dated Jul. 7, 2020, 16 pages.
Notice of Allowance from U.S. Appl. No. 15/858,357, dated May 26, 2020, 22 pages.
Notice of Allowance from U.S. Appl. No. 15/858,410, dated May 22, 2020, 18 pages.
Notice of Allowance from U.S. Appl. No. 15/867,496, dated May 28, 2020, 10 pages.
Notice of Allowance from U.S. Appl. No. 15/870,179, dated Jun. 11, 2020, 7 pages.
Wolff D, "A Web-Based Tool for Managing the Submission of Student Work," Journal of Computing Sciences in Colleges, Dec. 2004, vol. 20 (2), pp. 144-153.
Communication under Rule 94(3) EPC for European Application No. 18839962.0 dated Oct. 26, 2020, 9 pages.
Final Office Action from U.S. Appl. No. 15/867,486, dated Nov. 3, 2020, 38 pages.
Non-Final Office Action from U.S. Appl. No. 15/857,713, dated Nov. 25, 2020, 28 pages.
Notice of Allowance from U.S. Appl. No. 15/858,125, dated Nov. 3, 2020, 17 pages.
Notice of Allowance from U.S. Appl. No. 15/858,146, dated Nov. 17, 2020, 10 pages.
Examination Report for Australian Application No. 2018395933 dated Sep. 30, 2020, 4 pages.
Final Office Action from U.S. Appl. No. 15/857,713, dated Jul. 16, 2020, 22 pages.
Final Office Action from U.S. Appl. No. 15/867,612, dated Sep. 28, 2020, 16 pages.
Final Office Action from U.S. Appl. No. 15/868,511, dated Jul. 14, 2020, 10 pages.
Non-Final Office Action from U.S. Appl. No. 15/858,207, dated Sep. 30, 2020, 20 pages.
Non-Final Office Action from U.S. Appl. No. 15/858,430, dated Oct. 6, 2020, 11 pages.
Non-Final Office Action from U.S. Appl. No. 15/863,748, dated Aug. 18, 2020, 25 pages.
Non-Final Office Action from U.S. Appl. No. 15/867,505, dated Aug. 19, 2020, 21 pages.
Notice of Allowance from U.S. Appl. No. 15/858,110, dated Sep. 3, 2020, 11 pages.
Notice of Allowance from U.S. Appl. No. 15/858,125, dated Sep. 9, 2020, 17 pages.
Notice of Allowance from U.S. Appl. No. 15/858,146, dated Sep. 10, 2020, 9 pages.
Notice of Allowance from U.S. Appl. No. 15/858,357, dated Aug. 18, 2020, 12 pages.
Notice of Allowance from U.S. Appl. No. 15/858,410, dated Jul. 14, 2020, 12 pages.
Notice of Allowance from U.S. Appl. No. 15/863,815, dated Sep. 30, 2020, 13 pages.
Notice of Allowance from U.S. Appl. No. 15/868,505, dated Jul. 15, 2020, 8 pages.
Notice of Allowance from U.S. Appl. No. 15/868,511, dated Sep. 16, 2020, 9 pages.
Notice of Allowance from U.S. Appl. No. 15/870,179, dated Aug. 12, 2020, 7 pages.
Non-Final Office Action from U.S. Appl. No. 15/858,125, dated Dec. 31, 2019, 12 pages.
Non-Final Office Action from U.S. Appl. No. 15/858,207, dated Jan. 22, 2020, 15 pages.
Non-Final Office Action from U.S. Appl. No. 15/858,357, dated Jan. 7, 2020, 15 pages.
Notice of Allowance from U.S. Appl. No. 15/868,489, dated Jan. 24, 2020, 2 pages.
Notice of Allowance from U.S. Appl. No. 15/870,221, dated Jan. 17, 2020, 22 pages.
Notice of Allowance from U.S. Appl. No. 15/873,693, dated Jan. 30, 2020, 5 pages.

* cited by examiner

STORAGE INTERFACE FOR SYNCHRONIZING CONTENT

CROSS-REFERENCE TO RELATED APPLICATIONS

This application claims the benefit of U.S. provisional application No. 62/611,473, filed on Dec. 28, 2017, which is expressly incorporated by reference herein in its entirety.

TECHNICAL FIELD

The present technology pertains to distributed storage, collaboration and synchronization systems.

BACKGROUND

Cloud storage systems allow users to store and access data on the cloud. Some cloud storage systems allow users to share data with other users and access the data in a collaborative fashion. In some cases, users may also store and access local copies of the data on their client devices. The local copies of the data may provide users with faster access to the data. Additionally, the local copies can allow the user to access the data when the user is offline. Cloud storage systems may also allow users to synchronize their local copies of the data with the data on the cloud to ensure consistency. Cloud storage systems may attempt to synchronize copies of data across a number of client devices and servers so each copy of data is identical. However, synchronization of data across multiple devices can be an extremely difficult task, often resulting in undesirable loss of data and inconsistencies.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
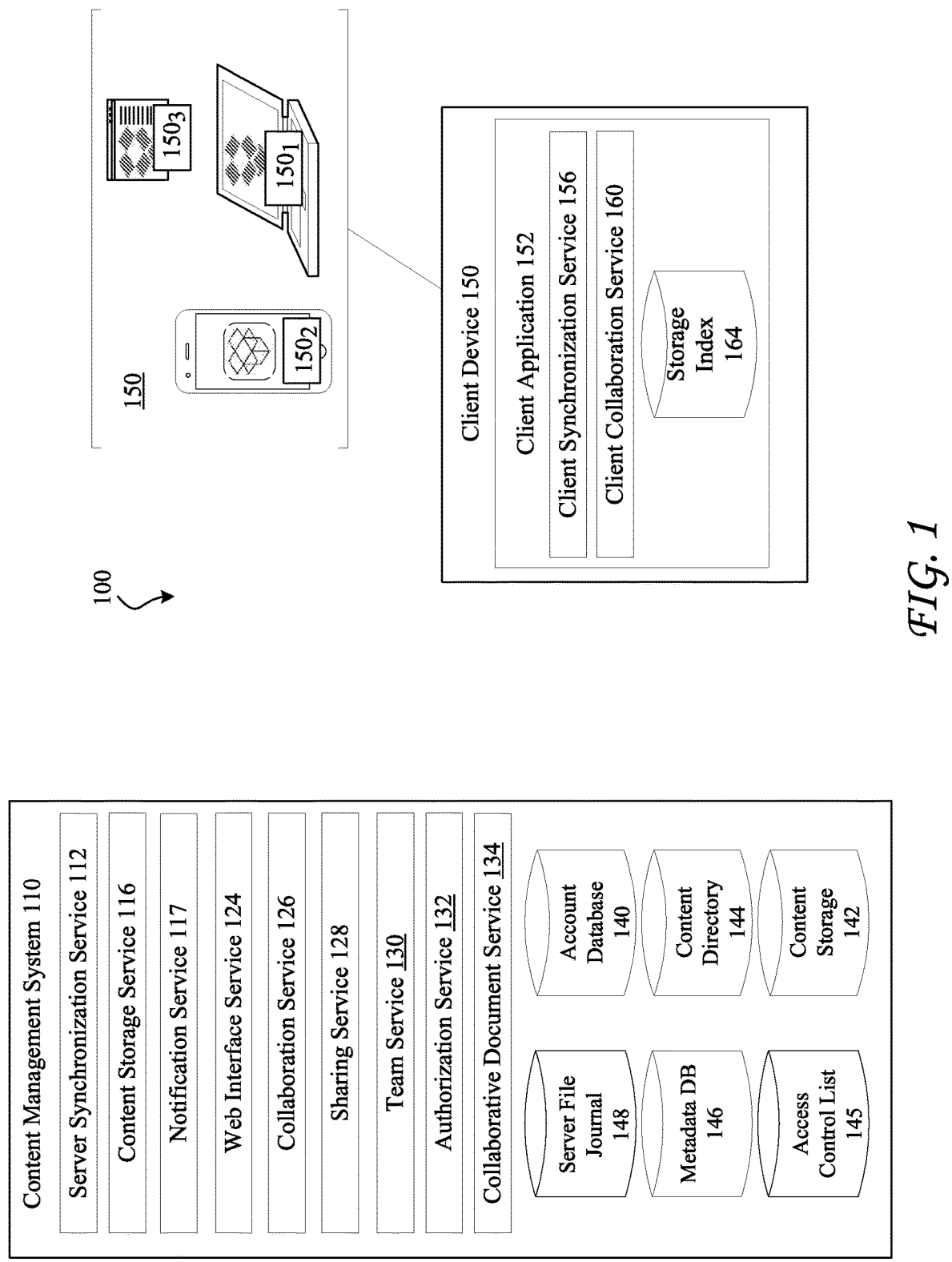
FIG. 1 shows an example of a content management system and client devices.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Cloud storage systems allow users to store and access content items across multiple devices. The content items may include, but are not limited to, files, documents, messages (e.g., email messages or text messages), media files (e.g., photos, videos, and audio files), folders, or any other unit of content. Content items may be shared with multiple users, edited, deleted, added, renamed, or moved. However, synchronizing content items shared or stored across several devices and user accounts has remained flawed and rife with technical obstacles.

To illustrate, a first machine (e.g., a client device or server) may send communications to a second machine that provides information about how a user's modification of content items on a cloud storage system. These communications may be used by the second machine to synchronize the content items on the second machine such that actions performed on content items on the first machine are reflected in content items on the second machine, and the content items on the first machine are substantially identical to the content items on the second machine.

However, in many cases, there may be several communications sent between the various machines, which may be difficult to manage. Moreover, some of the communications may be received out of order as a result of various issues, such as client or network problems. This often results in conflicts and errors between content items at the various machines. The user's activity may also generate a large number of revisions which can further complicate synchronization efforts and exacerbate inconsistencies. For example, a user may perform a large number of modifications to various content items, undo modifications in a short period of time, or quickly perform additional modifications to a previously modified content item. This increases the likelihood that changes and revisions from users are received out of order, causing outdated modifications and conflicting content items. As a result, some operations may not be compatible with the current state of the content items. Moreover, it can be extremely difficult to detect whether operations are in conflict.

There is also an inherent latency with synchronization actions. For example, actions taken on the first machine are first detected by the first machine, and a communication is then generated and transmitted through a network. The communication is received by the second machine which may still be processing previous communications, and actions detailed in the communications may be taken at the second machine. In this illustrative scenario, there are several possible points of latency, including the first machine, the second machine, and the network. As latency increases, the likelihood of conflicts between content items also increases. Processing such conflicted communications and resolving conflicts are extremely difficult and computationally expensive tasks.

Further complexity is introduced when the same or different user on the second machine or other machines with access to the content items make modifications to the content items. Additional technical issues arise when content items are modified locally and remotely in a large collaboration environment. As illustrated here, these issues can quickly multiply and grow in complexity, creating a wide array of problems and inconsistencies in the content items.

In some embodiments the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device $150_1$ is a computing device having a local file system accessible by multiple applications resident thereon. Client device $150_2$ is a computing device wherein content items are only accessible to a specific application or by permission given by the specific application, and the content items are typically stored either in an application specific space or in the cloud. Client device $150_3$ is any client device accessing content management system 110 via a web browser and accessing content items via a web interface. While example client devices $150_1$, $150_2$, and $150_3$ are depicted in form factors such as a laptop, mobile device, or web browser, it should be understood that the descriptions thereof are not limited to devices of these example form factors. For example a mobile device such as client $150_2$ might have a local file system accessible by multiple applications resident thereon, or client $150_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management system service 116. In some embodiments, client synchronization service 156 can perform some functions of content management system service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2A:
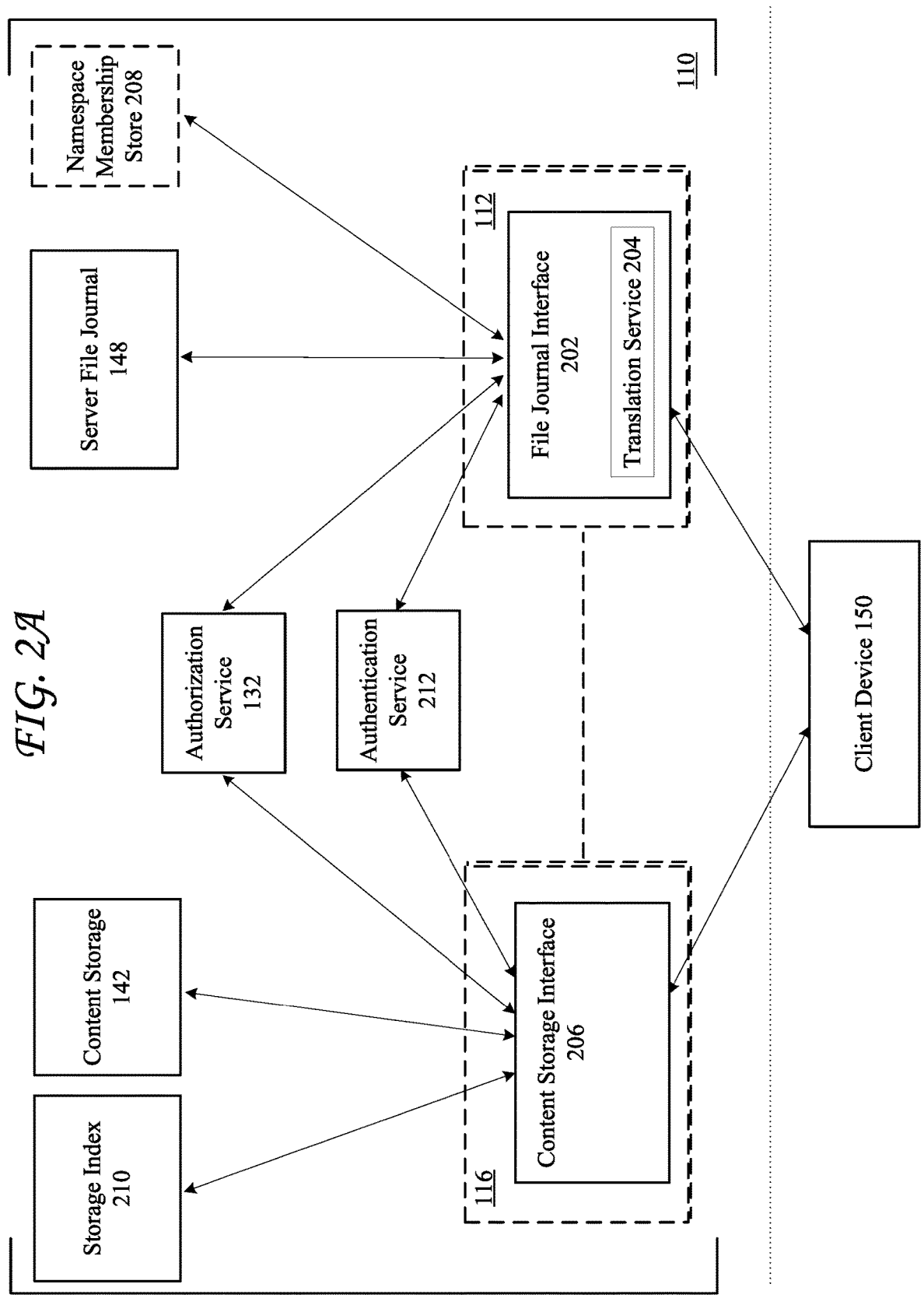
FIG. 2A shows a schematic diagram of an example architecture for synchronizing content between the content management system and client devices shown in FIG. 1A.

FIG. 2A illustrates a schematic diagram of an example architecture for synchronizing content between content management system 110 and client device 150 in system configuration 100. In this example, client device 150 interacts with content storage 142 and server file journal 148 respectively via content storage interface 206 and file journal interface 202. Content storage interface 206 can be provided or managed by content storage service 116, and file journal interface 202 can be provided or managed by server synchronization service 112. For example, content storage interface 206 can be a subcomponent or subservice of content storage service 116, and file journal interface 202 can be a subcomponent or subservice of server synchronization service 112.

Content storage interface 206 can manage communications, such as content requests or interactions, between client device 150 and content storage 142. Content storage interface 206 can process requests from client device 150 to upload and download content to and from content storage 142. Content storage interface 206 can receive content requests (e.g., downloads, uploads, etc.) from client device 150, authenticate client device 150 via authentication service 212, communicate with authorization service 132 to determine if client device 150 (and/or the request from client device 150) is authorized to upload or download the content to or from content storage 142 (e.g., based on permissions in access control list 145), and interact with content storage 142 to download or upload the content associated with the content requests from client device 150. If the request from client device 150 is a request to download a content item, content storage interface 206 can retrieve the content item from content storage 142 and provide the content item to client device 150. If the request from client device 150 is a request to upload a content item, content storage interface 206 can obtain the content item from client device 150 and upload the content item to content storage 142 for storage.

Figure 2B:
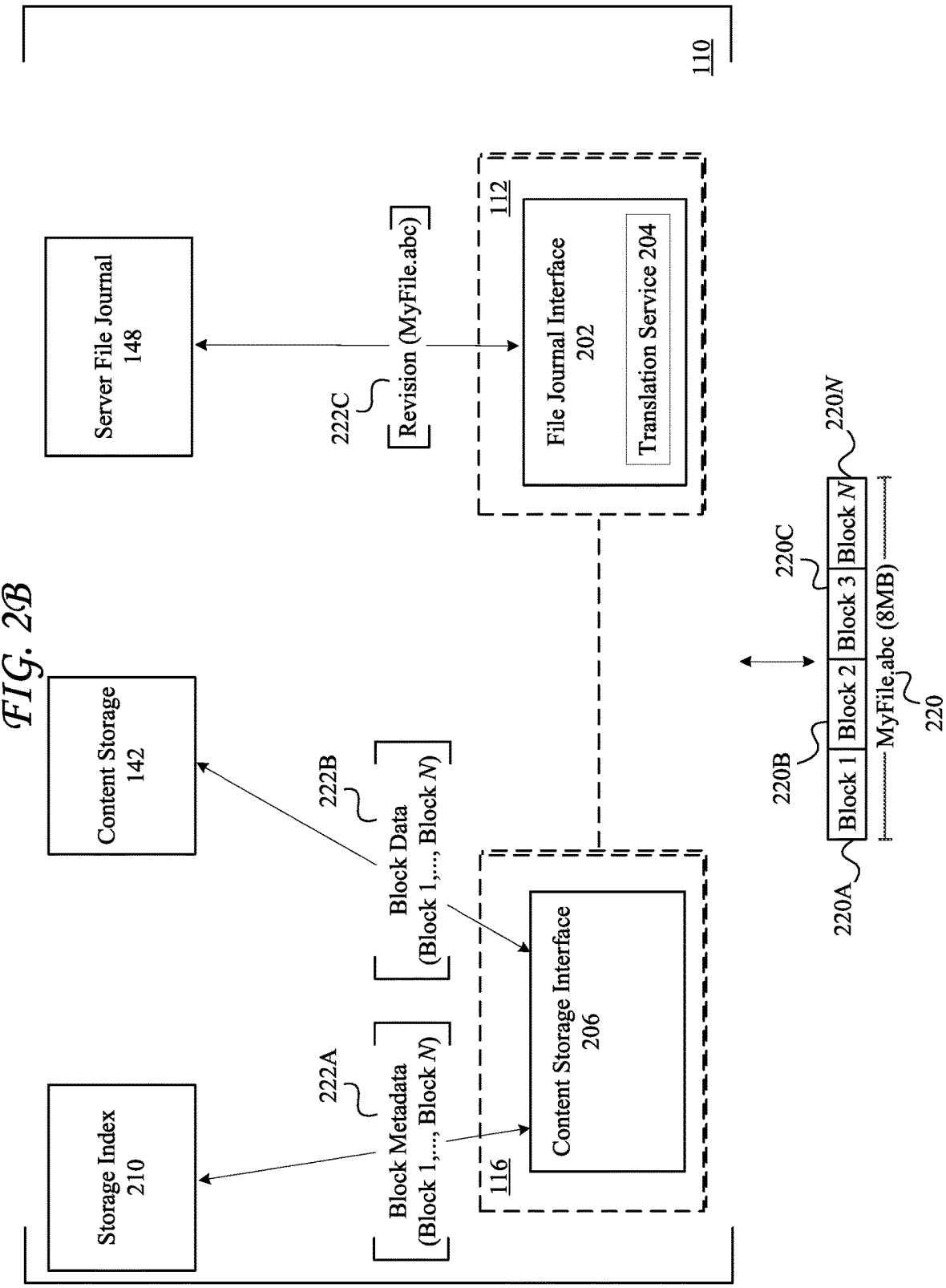
FIG. 2B shows an example configuration for storing and tracking blocks of content items in the example architecture for synchronizing content between the content management system and client devices shown in FIG. 2A.

When processing content requests from client device 150, content storage interface 206 can communicate with storage index 210 to check the availability and/or storage location of the requested content in content storage 142, and track content items in content storage 142. Storage index 210 can maintain an index of content items on content storage 142 which identifies the content items on content storage 142 and can also identify a respective location of the content items within content storage 142. Thus, storage index 210 can track content items on content storage 142 as well as storage locations of the content items. Storage index 210 can track entire content items, such as files, and/or portions of the content items, such as blocks or chunks. In some cases, content items can be split into blocks or chunks which can be stored at content storage 142 and tracked in storage index 210. For example, content storage 142 can store a content item as blocks or chunks of data which include respective data portions of the content item. Storage index 210 can track the blocks or chunks of the content item stored in content storage 142. FIG. 2B described below illustrates an example configuration for storing and tracking blocks of content items.

File journal interface 202 can manage communications, such as metadata requests and content synchronizations and operations, between client device 150 and server file journal 148. For example, file journal interface 202 can translate, validate, authenticate, and/or process operations, configurations, and state information between client device 150 and server file journal 148. File journal interface 202 can verify permissions from an FSAuth token in a cursor or through authorization service 132 to authorize, or verify authorization of, requests sent by client device 150 to server file journal 148. When processing requests or operations from client device 150, file journal interface 202 can access namespace membership store 208 to determine or verify namespace ownership information for any namespaces associated with the requests or operations from client device 150, and verify permissions of content associated with the requests or operations from client device 150.

Translation service 204 in file journal interface 202 can perform linearization and translation operations for communications between client device 150 and server file journal 148. For example, translation service 204 can translate communications from client device 150 to a different format consistent with the structure and format of data in server file journal 148, and vice versa. To illustrate, in some cases, client device 150 can process content item information (e.g., state, changes, versions, etc.) at client device 150 as operations, while server file journal 148 can process the same information as content item revisions reflected by rows in a data structure such as a database table. To enable synchronization of content item information between client device 150 and server file journal 148, translation service 204 can translate operations from client device 150 into revisions suitable for server file journal 148, and can translate revisions reflected in rows of data on server file journal 148 to operations suitable for client device 150.

In some cases, content management system 110 (e.g., file journal interface 202, authorization service 132, or content storage interface 206) can generate a token that verifies or indicates that client device 150 is authorized to access, update, download, or upload a requested content item. The token can include a device identifier associated with client device 150, an account identifier associated with a user account authenticated or authorized at client device 150, a session identifier associated with an authorized session at client device 150, a view context, an encryption key, access permissions to identified content item(s), etc. The token can be provided with or in a cryptographically signed data object called a cursor, which will be described in greater detail below. Content management system 110 (e.g., file journal interface 202, authorization service 132, or content storage interface 206) can send the token(s) to client device 150, and client device 150 can provide the token to content management system 110 when requesting content item revisions and/or updates to server file journal 148 as further described below. Client device 150 can also provide the token to content storage interface 206 to validate any content requests (e.g., downloads, uploads, etc.). Content storage interface 206 can use the token to authorize queries to storage index 210 and upload or download content items to or from content storage 142.

For example, client device 150 can send to content storage interface 206 a request to upload a content item to content storage 142. The request can include the token and the content item to be uploaded. Content storage interface 206 can use the token to authorize a query to storage index 210 to check if the content item already exists on content storage 142, and/or authorize the upload of the content item to content storage 142. Client device 150 can provide the token to file journal interface 202 to authorize a request to store metadata on server file journal 148 to track the upload and revision of the content item.

FIG. 2B illustrates an example block storage and synchronization configuration. In this example, content storage 142 can store blocks of data, which can be opaque chunks of content items (e.g., files) up to a particular size (e.g., 4 MB). Content items can be split into blocks and the blocks can be stored at content storage 142 for access. Storage index 210 can track blocks stored at content storage 142, as well as the respective locations of the blocks stored at content storage 142. File journal interface 202 can interact with server file journal 148 to track revisions to the content items and/or blocks stored at content storage 142.

For example, content item 220 (e.g., MyFile.abc) can be split into blocks 220A, 220B, 220C, 220N. Content storage interface 206 can receive blocks 220A, 220B, 220C, 220N and send block data 222B to content storage 142 for storage at content storage 142. Block data 222B can include blocks 220A, 220B, 220C, 220N associated with content item 220.

Blocks 220A, 220B, 220C, 220N can be stored on one or more storage devices or volumes at content storage 142 and/or aggregated within one or more logical storage containers (e.g., buckets) or data clusters. In some cases, blocks 220A, 220B, 220C, 220N can be stored together on a same location (e.g., storage device, volume, container, and/or cluster). In other cases, some or all of blocks 220A, 220B, 220C, 220N can be stored on two or more different locations (e.g., two or more different storage devices, volumes, containers, and/or clusters).

Content storage interface 206 can also store block metadata 222A at storage index 210. Block metadata 222A can identify blocks 220A, 220B, 220C, 220N, and allows storage index 210 to track blocks 220A, 220B, 220C, 220N at content storage 142. Block metadata 222A can include an identifier for each block 220A, 220B, 220C, 220N. The identifier for a block can be a name or key, such as a hash of the block, which identifies the block.

Block metadata 222A can also include location information for blocks 220A, 220B, 220C, 220N, which indicates the respective storage location of blocks 220A, 220B, 220C, 220N. The location information of a block can identify the storage device or volume where the block is stored and/or a logical storage container or data cluster where the block is contained. The location information can be used to access or retrieve the associated block.

Content storage interface 206 can store block metadata 222A at storage index 210 before or after storing blocks 220A, 220B, 220C, 220N at content storage 142. For example, content storage interface 206 can store blocks 220A, 220B, 220C, 220N at content storage 142 and subsequently store block metadata 222A at storage index 210 to indicate that blocks 220A, 220B, 220C, 220N have been stored at content storage 142.

In some cases, content storage interface 206 can query storage index 210 prior to storing blocks 220A, 220B, 220C, 220N at content storage 142, to determine if (or where) blocks 220A, 220B, 220C, 220N are stored at content storage 142. For example, content storage interface 206 can query storage index 210 based on block metadata 222A to check if blocks 220A, 220B, 220C, 220N are stored at content storage 142. Storage index 210 can compare block identifiers in block metadata 222A with block identifiers at storage index 210 to check for any matches. A match between block identifiers indicates that an associated block is stored at content storage 142.

As previously mentioned, server file journal 148 tracks content item revisions, including content item adds, edits, moves or renames, deletes, etc. Accordingly, file journal interface 202 can store revision 222C at server file journal 148 to indicate that content item 220 and/or blocks 220A, 220B, 220C, 220N were added to content storage 142. Revision 222C can represent a revision of content item 220 within a journal of content item revisions at server file journal 148.

Revision 222C can identify content item 220 and an operation associated with content item 220, such as an add operation (e.g., upload), edit operation, move or rename operation, delete operation, etc. Revision 222C can also identify a namespace in content management system 110 where content item 220 is stored, and a row in a journal of content item revisions at server file journal 148 for storing revision 222C. The row within the journal of content item revisions can represent a revision number associated with revision 222C for content item 220.

Figure 2C:
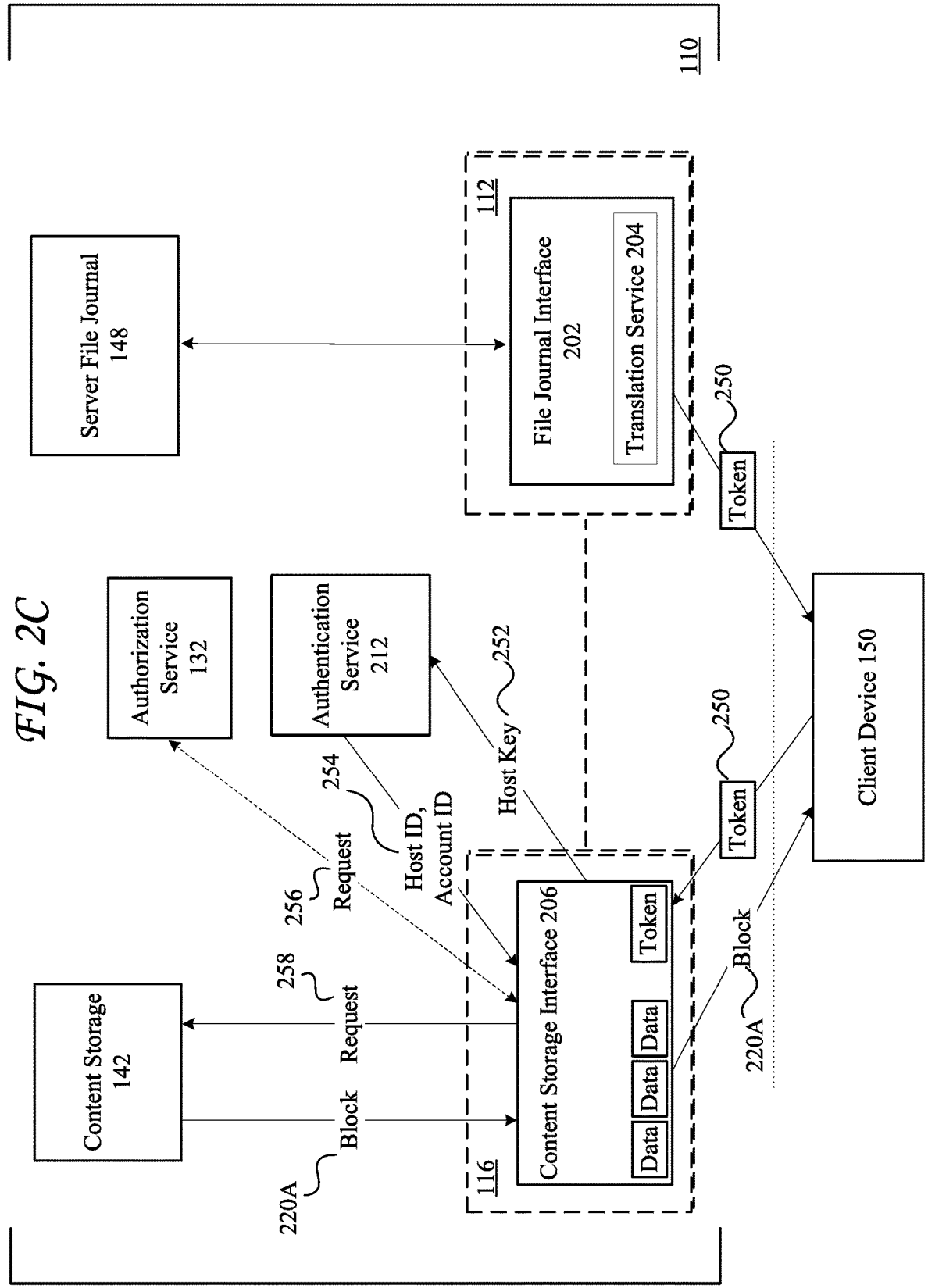
FIG. 2C shows a diagram of an example process for downloading data blocks from a content management system.

FIG. 2C shows a diagram of an example process for downloading a block (220A) of data from content storage 142 to client device 150. In this example, client device 150 can receive from file journal interface 202 token 250 for use when requesting block 220A from content storage interface 206. Token 250 can be a key or encrypted data object that authorizes access (e.g., download) of block 220A from content storage 142. Client device 150 can provide token 250 to content storage interface 206 when requesting block 220A to demonstrate to content storage interface 206 that client device 150 is authorized to access block 220A from content storage 142. In some cases, client device 150 can provide token 250 to content storage interface 206 with or in a block request or operation.

Content storage interface 206 can receive token 250 with a download request and verify that token 250 is valid and/or has not expired. For example, token 250 can include an expiration date or period to prevent client device 150 (or any other device with possession of token 250) from using token 250 indefinitely and require re-authorization. Content storage interface 206 can thus receive token 250 and verify that the expiration date or period has not been exceeded.

If content storage interface 206 determines that token 250 is valid and is not expired, content storage interface 206 can determine that client device 150 is allowed to download block 220A. Token 250 can thus allow client device 150 to prove it is authorized to download block 220A and forego a separate authorization process through authorization service 132. Content storage interface 206 can thus avoid performing a separate query to authorization service 132 to authorize client device 150.

If content storage interface 206 otherwise determines that token 250 is invalid or expired, content storage interface 206 can attempt to authorize the access to block 220A through authorization service 132. For example, content storage interface 206 can send an authorization request (256) to authorization service 132 to check whether client device 150 is authorized to download block 220A. Authorization service 132 can check access permissions (e.g., access control list 145) for block 220A and/or determine if client device 150 is authorized to download block 220A, and respond to the authorization request (256) from content storage interface 206. Content storage interface 206 can thus query authorization service 132 as a backup authorization option for when token 250 is invalid or expired.

In addition, content storage interface 206 can authenticate client device 150 through authentication service 212. This way, content storage interface 206 can confirm that client device 150 is both properly authenticated and authorized to access requested content (e.g., block 220A). In some cases, to authenticate client device 150, content storage interface 206 sends host key 252 corresponding to client device 150 to authentication service 212, and authentication service 212 can return authentication data 254 or an error if host key is invalid. Authentication data 254 can include, for example, a host identifier associated with client device 150 and an account identifier associated with client device 150 and/or a session at client device 150. The host identifier and account identifier can be determined by authentication service 212 based on host key 252. For example, host key 252 can be a key or encrypted object that identifies client device 150 and a user account at client device 150. Authentication service 212 can receive host key 252 and identify the host identifier and account identifier for client device 150. The host identifier and account identifier can uniquely authenticate client device 150 at content management system 110.

To retrieve block 220A from content storage 142, content storage interface 206 sends request 258 for block 220A to content storage 142. In some cases, request 258 can include a get operation for retrieving block 220A from content storage 142, as further described with reference to FIG. 3D. Moreover, in some cases, prior to sending request 258, content storage interface 206 can query storage index 210 to verify that block 220A is available (e.g., stored) at content storage 142.

Content storage 142 receives request 258, retrieves block 220A, and sends block 220A to content storage interface 206. Once content storage interface 206 receives block 220A from content storage 142, content storage interface 206 can stream or download block 220A to client device 150. However, content storage interface 206 will not stream or download block 220A to client device 150 until or unless content storage interface 206 has confirmed that client device 150 is authenticated and authorized to access block 220A via token 250, authentication service 212, and/or authorization service 132, as previously explained. Once content storage interface 206 has confirmed that client device 150 is authenticated and authorized to access block 220A, content storage interface 206 sends block 220A to client device 150.

Content storage interface 206 can download the entire block (220A) to client device 150 or stream portions or chunks of the block (220A) to client device 150. In some cases, content storage interface 206 streams portions of block 220A to client device 150. The size of the streamed portions can vary based on one or more factors, such as network connectivity, block size, latency, congestion, preferences, etc. For example, content storage interface 206 can stream block 220A to client device bit-by-bit or multiple bits at a time.

Before sending block 220A to client device 150, content storage interface 206 can perform any operations on block 220A to prepare block 220A for client device 150. For example, content storage interface 206 can compress, decompress, encrypt, etc., any portion(s) of block 220A and provide such portions to client device 150 in compressed, decompressed, or encrypted form.

In some cases, content storage interface 206 can perform one or more operations on block 220A or portions of block 220A as block 220A is streamed to client device 150. For example, content storage interface 206 can compress and encrypt a first portion of block 220A and begin streaming that compressed and encrypted portion to client device 150. Content storage interface 206 can compress and encrypt one or more of the remaining portions of block 220A as client device 150 streams the first portion. When client device 150 completes downloading the first portion, content storage interface 206 can begin streaming the next compressed and encrypted portions of block 220A to client device 150. Content storage interface 206 can continue compressing and encrypting portions of block 220A while client device 150 downloads other portions of block 220A. This way, content storage interface 206 can hide any delays in compressing and encrypting portions of block 220A within the downloading time used by client device 150 to download the various portions of block 220A.

In some cases, content storage interface 206 can determine which operations to perform on block 220A, including the type and/or number of operations, based on the download speed or latency of client device 150. For example, if client device 150 has a slow network connection or is experiencing higher latencies, content storage interface 206 can select better or more intensive compression and/or encryption algorithms for compressing and/or encrypting the portions of block 220A streamed to client device 150. Thus, content storage interface 206 can leverage the slower download times of client device 150 to perform compression or encryption of the data streamed to client device 150. On the other hand, if client device 150 has a fast network connection and download times, content storage interface 206 may perform faster compression and/or encryption algorithms on the data streamed to client device 150 or even skip some or all operations on the data.

While FIG. 2C shows client device 150 including token 250 in the request for block 220A to content storage interface 206, in some cases client device 150 may not include token 250 in the request for block 220A. For example, if client device 150 does not have token 250 or chooses not to use token 250, client device 150 can request block 220A from content storage interface 206 without providing token 250. Here, content storage interface 206 can attempt to authorize the request from client device 150 through authorization service 132, as previously described.

For security, content storage interface 206 can attempt to return authorization or authentication errors immediately after, or prior to, determining whether the requested content is available in content storage 142, in order to avoid revealing whether the data is even available at content storage 142. For example, a malicious user may try to send a request for data to content storage interface 206 hoping to infer from the time or sequence of the response from content storage interface 206 whether such data is available at content management system 110. The malicious user may even have a copy of the requested data and request the data simply to determine whether such data is available at content management system 110.

To illustrate, a malicious user may not be authorized or authenticated to access block 220A but nevertheless request block 220A from content storage interface 206 to try to determine whether block 220A is stored in content storage 142. If content storage interface 206 checks if block 220A is available at content storage 142 before returning an authentication or authorization error, the response time of the authentication or authorization error may reveal to the malicious user whether block 220A is available at content storage 142. The malicious user may infer that block 220A is available at content storage 142 if there is a delay in the error and may otherwise infer that block 220A is not available when the error is returned faster. The malicious user may assume that content storage interface 206 will quickly return an error if block 220A is not available to begin with, and may delay responding if block 220A is available and content storage interface 206 attempts to authorize or retrieve block 220A.

To prevent such security issues, content storage interface 206 can authorize access to block 220A before or in parallel to requesting block 220A from content storage 142. For example, when client device 150 requests block 220A, content storage interface 206 can send authentication, authorization, and content requests (252, 256, 258) to authentication service 212, authorization service 132, and content storage 142, respectively, and immediately return any errors generated by authentication service 212 or authorization service 132. Content storage interface 206 can send the requests (252, 256, 258) in parallel or contemporaneously and attempt to respond to the request within a similar timeframe irrespective of whether block 220A is or is not available at content storage 142.

Figure 2D:
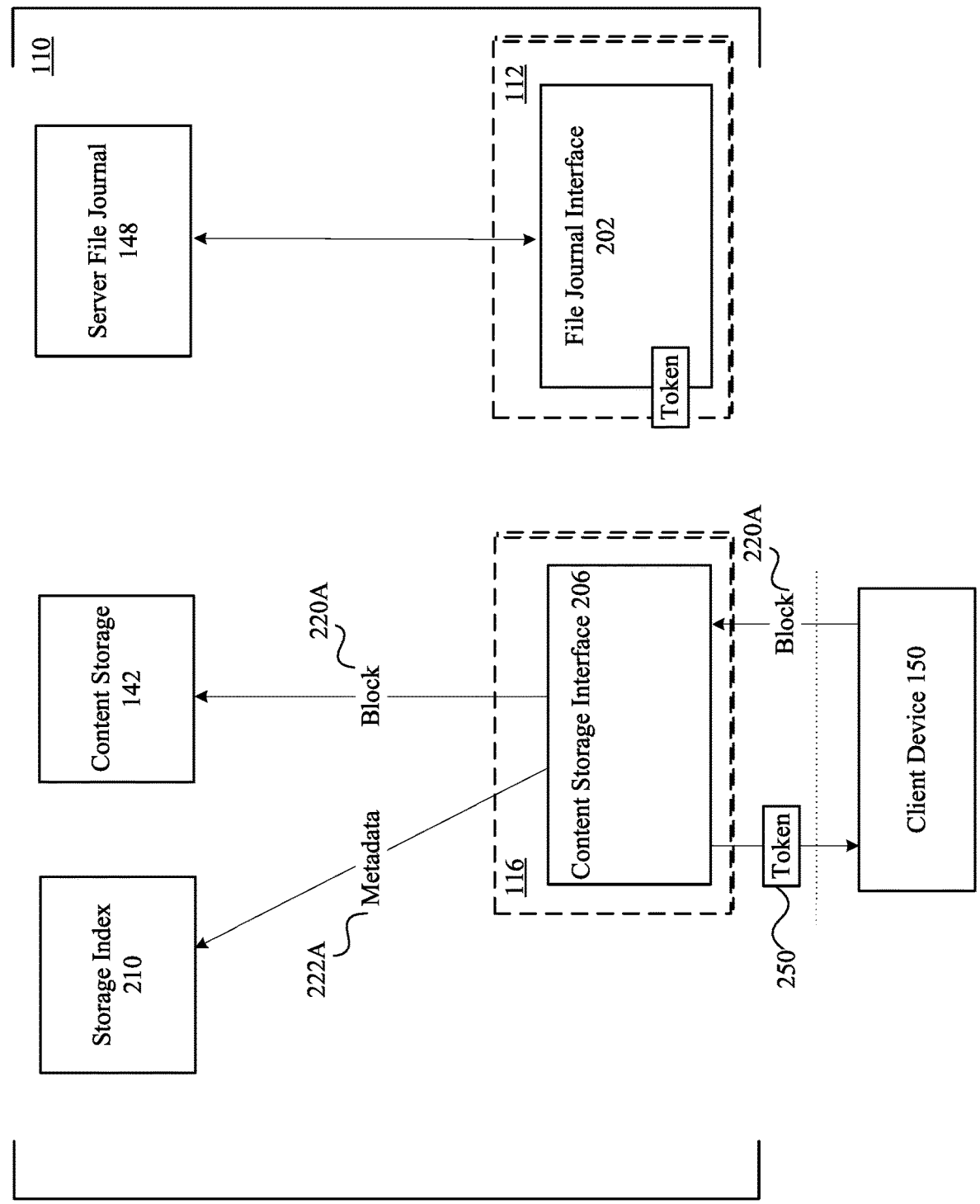
FIG. 2D shows a diagram of an example process for uploading data blocks to a content management system.

FIG. 2D shows a diagram of an example process for uploading block 220A to content storage 142. In this example, client device 150 sends block 220A to content storage interface 206 in order to upload block 220A to content storage 142. Client device 150 can send block 220A along with an upload request including metadata about block 220A, such as a unique identifier, a namespace identifier, a server file journal identifier, a path, etc. In some cases, client device 150 can provide a hash or fingerprint identifying block 220A. Client device 150 can upload the entire block at once or upload the block in portions or chunks. In some cases, client device 150 can select how to upload block 220A, including the size of each upload portion(s).

Content storage interface 206 receives block 220A from client device 150 and can return token 250 to client device 150. Token 250 can authorize client device 150 to access block 220A on future requests. In other words, client device 150 can use token 250 to demonstrate it is authorized to access block 220A. In some cases, to generate token 250, content storage interface 206 can infer that client device 150 is authorized to access block 220A based on the fact that block 220A was received from (e.g., originated from) client device 150 or was uploaded to content storage 142 by client device 150. Content storage interface 206 can then provide token 250 to client device 150, and client device 150 can then use token 250 for future access requests for block 220A. Token 250 can include an expiration date or period, as previously explained, to prevent client device 150 from using token 250 to access block 220A after a threshold period of time and require client device 150 to re-authorize before accessing block 220A after the expiration date or period.

In some cases, file journal interface 204 can also use token 250 to commit the upload of block 220A to content management system 110. File journal interface 204 can add a journal revision to server file journal 148 corresponding to the upload of block 220A, as further explained below with reference to FIGS. 3A, 3B, 4A, 4B, and 5A. The revision can record the upload of block 220A in a journal on server file journal 148 that tracks the state of content items at content management system 110. When adding the journal revision to record the upload, file journal interface 204 can use token 250 to authorize the revision added to server file journal 148 tracking the upload of block 220A by client device 150.

As part of the upload process, content storage interface 206 sends block 220A from client device 150 to content storage 142 for storage. Content storage interface 206 can send block 220A to content storage 142 before file journal interface 204 commits the upload to server file journal 148, while file journal interface 204 commits the upload to server file journal 148, or after file journal interface 204 commits the upload to server file journal 148. In some cases, content storage interface 206 sends block 220A to content storage 142 during the commit of the upload by file journal interface 204 in order to minimize delays. In other cases, content storage interface 206 sends block 220A to content storage 142 once the commit of the upload by file journal interface 204 has succeeded to prevent block 220A from being uploaded to content storage 142 if the commit fails.

Prior to sending block 220A to content storage 142, content storage interface 206 can check the hash or fingerprint of block 220A to verify the data and integrity. In some cases, content storage interface 206 can compress, decompress, or encrypt block 220A prior to sending to content storage 142. Content storage interface 206 can perform operations (e.g., compression, decompression, encryption, etc.) on the data from client device 150 as it receives the data from client device 150 to hide any delays from the operations performed on the data as previously mentioned with respect to FIG. 2C. Content storage interface 206 can also leverage the upload speed of client device 150 when processing the uploaded data. For example, content storage interface 206 can select the compression, decompression, or encryption algorithms based on the network performance of client device 150 as previously described.

Content storage interface 206 can also send metadata (222A) of block 220A to storage index 210 as described in FIG. 2B. The metadata can identify block 220A and may be used to locate block 220A on content storage 142 and/or determine if block 220A is available at content storage 142.

After storing block 220A on content storage 142, client device 150 token 250 can authorize future requests for block 220A from client device 150. For example, client device 150 can use token 250 to download block 220A from content storage 142 as previously explained with reference to FIG. 2C. If token 250 later expires or is lost by client device 150, client device 150 can still access block 220A through a separate authorization procedure as previously described. Client device 150 can also use token 250 to authorize future revision updates on server file journal 148.

In some cases, content storage interface 206 may not upload block 220A to content storage 142 until a predetermined number of additional blocks have been received by content storage interface 206 for upload to content storage 142. For example, rather than uploading each individual block of a content item to content storage 142, content storage interface 206 may pause uploading block 220A to content storage 142 until it has received n number of blocks or requests from client device 150. Content storage interface 206 may prefer to upload blocks in batch or may deliberately wait until it receives a number of blocks to prevent a malicious user from using timing information to infer information about the content items available or authorized on content management system 110, as previously explained. For example, content storage interface 206 can wait until a certain number of blocks have been received to upload the blocks in order to increase the timing similarity of upload request responses despite potential differences in content or conditions associated with the requests, such as differences in data upload sizes, differences in authorization conditions or responses (e.g., authorized vs unauthorized), differences in authentication conditions (e.g., authenticated vs unauthenticated), differences in data validity, etc.

Figure 3A:
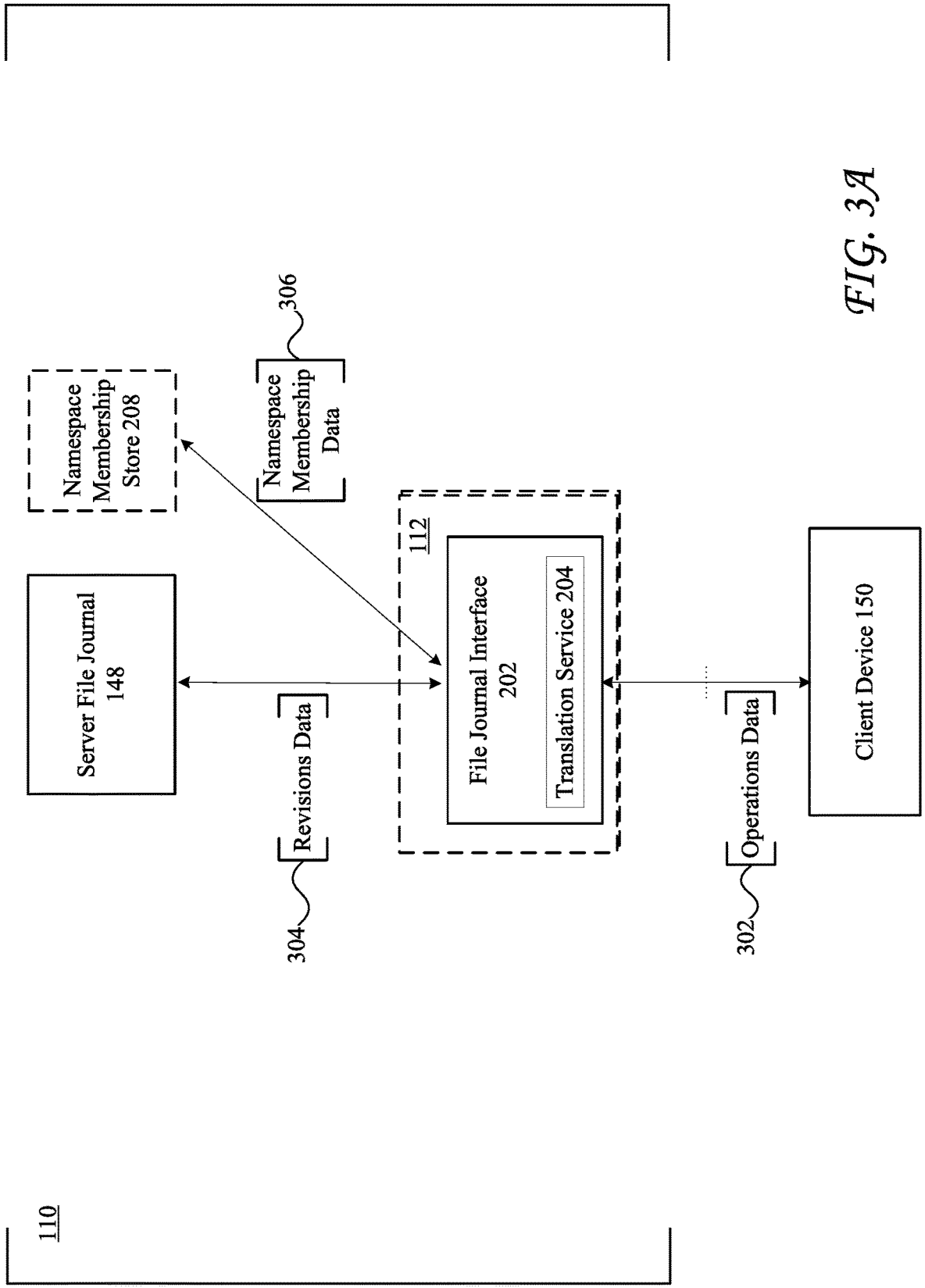
FIG. 3A shows a diagram of example communications processed by a file journal interface between a client device and a server file journal on a content management system.

FIG. 3A shows a diagram of communications processed by file journal interface 202 between client device 150 and server file journal 148. Server file journal 148 tracks content item state and changes (e.g., revisions) as values in rows and fields in server file journal 148. For example, server file journal 148 can maintain one or more journals of revisions to content items in content storage 142. The one or more journals can track revisions of each content item on each namespace. A row of values in a journal on server file journal 148 can identify a content item in a namespace and reflects a state of the content item in the namespace. A subsequent row in the journal corresponding to the same content item in the namespace can reflect a subsequent revision to the content item in the namespace. Thus, rows in server file journal 148 associated with a content item can identify the current state of the content item and any revisions to the content item from creation to the current state.

To synchronize content item information (e.g., state, changes or revisions, etc.) with client device 150, server file journal 148 can send or receive revisions data 304 to or from file journal interface 202, which represent revisions tracked or stored in server file journal 148 for one or more content items. Revisions data 304 can include, for example, a log of content item revisions corresponding to rows in server file journal 148. Server file journal 148 can send revisions data 304 to file journal interface 204, which can translate revisions data 304 into operations data 302 for client device 150, as further described below.

Client device 150 can perform content operations to update or modify content items at client device 150. To synchronize content item information with server file journal 148, client device 150 can send or receive operations data 302 to or from file journal interface 202. Client device 150 can send operations data 302 to file journal interface 202 to report changes at client device 150 to content items, and receive operations data 302 from file journal interface 202 to obtain the latest state of content items from server file journal 148 (e.g., revisions data 304).

For example, client device 150 can edit content item A at client device 150 and report to file journal interface 202 an edit operation indicating the edit to content item A. The edit operation can be included in operations data 302 communicated with file journal interface 202 to indicate the revision to content item A. File journal interface 202 can receive operations data 302 including the edit operation and generate a revision for storage at server file journal 148, tracking the edit to content item A. File journal interface 202 can include the revision associated with the edit operation in revisions data 304 to server file journal 148, in order to update server file journal 148 to store the revision representing the edited state of content item A.

As further described below, operations data 302 can include a cursor which identifies the latest state or revision obtained by client device 150 for each namespace associated with client device 150. For example, the cursor can identify the latest revision in server file journal 148 obtained by client device 150 for each namespace associated with client device 150. The information in the cursor allows file journal interface 202 to determine whether an operation in operations data 302 from client device 150 reflects the latest state or revisions in server file journal 148 for the namespace(s) associated with the operation. This can help file journal interface 202 ensure that operations in operations data 302 from client device 150 that correspond to older revisions in server file journal 148 are not written to server file journal 148, which can create a conflict between existing revisions in server file journal 148 and revisions translated from operations data 302.

To enable synchronization of content item information between client device 150 and server file journal 148, file journal interface 202 can translate (e.g., via translation service 204) operations data 302 to revisions data 304, and vice versa. When receiving operations data 302 from client device 150, file journal interface 202 can convert operations data 302 to revisions data 304, which includes content item revisions interpreted from operations in operations data 302. When receiving revisions data 304 from server file journal 148, file journal interface 202 can convert revisions data 304 to operations data 302, which include operations for implementing revisions in revisions data 304 at client device 150. Revisions data 304 includes data in server file journal 148 describing what happened to one or more content items (i.e., revisions to the one or more content items), and operations data 302 includes operations that have been executed or should be executed at client device 150 to modify the one or more content items. Thus, file journal interface 202 can translate data describing revisions to one or more content items from server file journal 148 (e.g., operations data 304) to operations that have or should be executed at client device 150 to modify the one or more content items at client device 150.

As previously noted, in addition to translating operations data 302 from client device 150 to revisions data 304 for server file journal 148, file journal interface 202 can convert revisions data 304 from server file journal 148 to operations data 302 for client device 150. File journal interface 202 can obtain revisions data 304 from server file journal 148 and translate revisions in revisions data 304 to operations for execution at client device 150 to revise one or more content items at client device 150 according to such revisions. The operations generated from the revisions in revisions data 304 are included in operations data 302 provided by file journal interface 202 to client device 150. This translation between operations data 302 and revisions data 304 allows client device 150 and server file journal 148 to synchronize content item information with each other as necessary.

Prior to writing to server file journal 148 any revision data 304 generated from operations data 302 provided by client device 150, file journal interface 202 can check a cursor in operations data 302 and/or query server file journal 148 to ensure any revisions in revisions data 304 do not create a conflict in server file journal 148. For example, file journal interface 202 can query server file journal 148 to check whether the version of a content item associated with a revision in revisions data 304 is the same the version of the content item at server file journal 148, or whether the version of the content item at server file journal 148 is an updated or different version as the content item to which the revision in revisions data 304 pertains. If server file journal 148 shows that the latest version of the content item is a different version than the version to which revision data 304 pertains, the two versions are in conflict.

File journal interface 202 can update server file journal 148 to store new revisions included in revisions data 304 derived from operations data 302. When querying and/or updating revisions in server file journal 148, file journal interface 202 can query namespace membership store 208 to retrieve namespace ownership information associated with any namespaces affected by the revisions in revisions data 304. The namespace ownership information can indicate which user account(s) own or are members of a particular namespace, and thus are able to access the particular namespace. Thus, file journal interface 202 can analyze the namespace ownership information to ensure server file journal 148 is not updated to include a revision to a namespace from a user account that is not a member of the namespace.

Figure 3B:
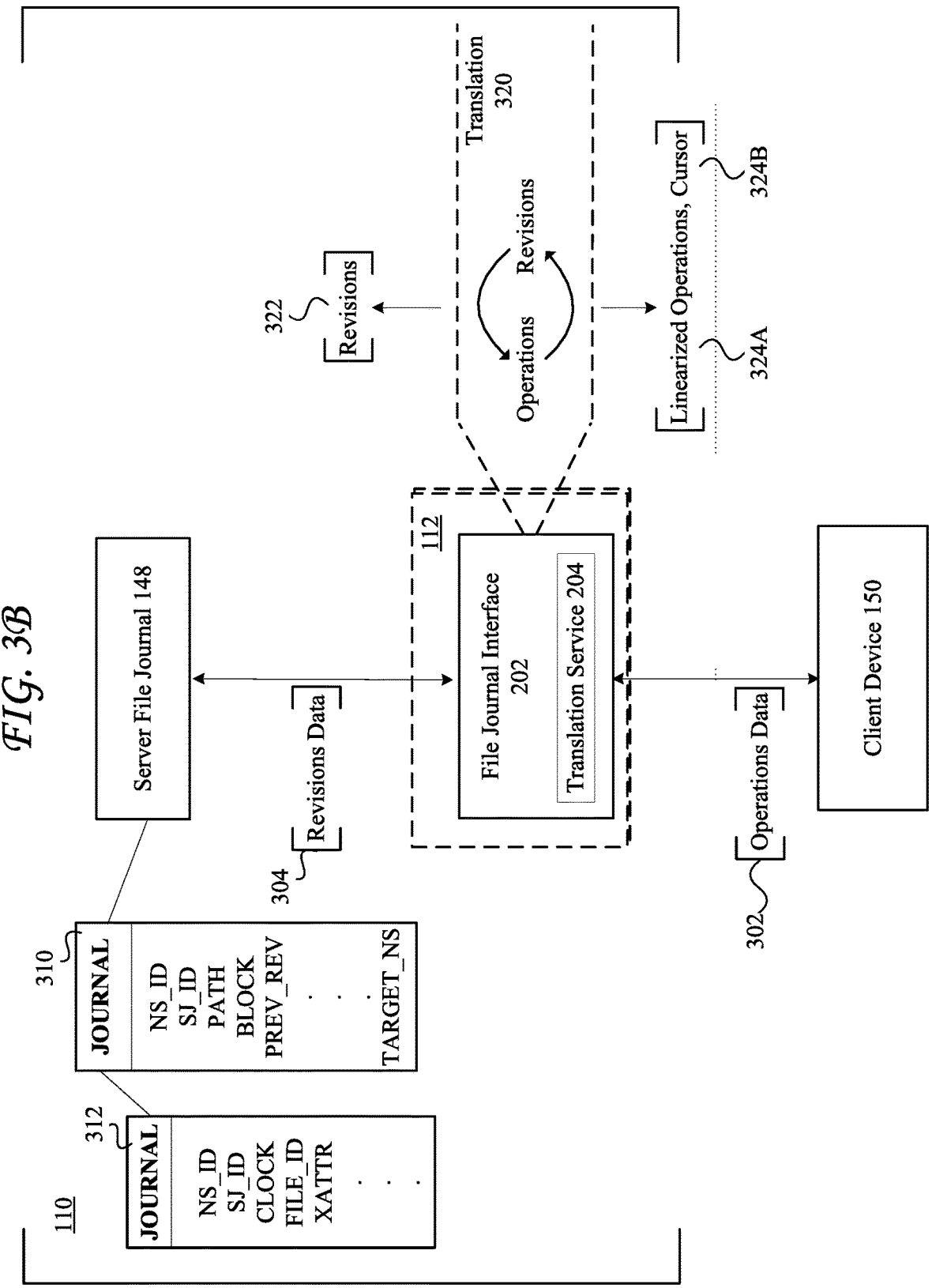
FIG. 3B shows a diagram of an example process for translating communications between a client device and a server file journal on a content management system.

With reference to FIG. 3B, server file journal 148 can store journals 310, 312 to track and identify content item revisions and state. In this example, journal 310 includes records containing a namespace identifier (NSID), server journal identifier (SJID), path, block, previous revision (Prev_Rev), and target namespace (Target NS). NSID can include one or more values for uniquely identifying a namespace in server file journal 148. SJID include monotonically increasing values which map to a row in a given namespace and provides an ordering of operations or revisions within that namespace. The path can be a namespace-relative path that identifies an associated content item. Prev_Rev identifies the SJID of the row which corresponds to the previous state of the content item associated with the path. Target NS identifies the NSID of the target namespace for a mount point of a mounted namespace. The Target NS field is not set for rows (e.g., revisions) which do not correspond to mount points.

Journal 312 includes records containing an NSID, SJID, clock (e.g., timestamp), file identifier (FileID), extended attribute(s) (xattr), etc. The xattr can store metadata associated with content items or operations.

In some cases, journal 310 can include other fields such as a size field which represents the size of an associated content item, a directory field (e.g., Is_Dir) which can be set to indicate when a content item is a directory, a file identifier that uniquely identifies the associated file, a clock or timestamp field, etc.

File journal interface 202 can perform translation 320 based on operations data 302 and revisions data 304 as previously mentioned. When performing translation 320, translation service 204 can transform operations data 302 into revisions 322, which include linearized revisions for storage at server file journal 148. Translation service 204 can also transform revisions data 304 into linearized operations 324A, included in operations data 302 sent to client device 150, which can be applied by client device 150 to update content item information (e.g., state, changes, etc.) at client device 150. Translation service 204 can also generate or update cursor 324B and provide cursor 324B in operations data 302 to client device 150. Cursor 324B identifies a respective revision or row in server file journal 148 corresponding to each namespace and/or content item associated with linearized operations 324B.

For example, cursor 324B can identify a namespace (e.g., NSID) and row in server file journal 148 for that namespace (e.g., SJID), which indicate the latest revision in server file journal 148 for that namespace. The namespace and row in cursor 324B can be associated with an operation in linearized operations 324A. Cursor 324B can identify a specific position on a log of revisions in server file journal 148 for the particular namespace, indicating the revision or state of the namespace in server file journal 148 after and/or before linearized operations 324A are applied at client device 150. Thus, cursor 324B can indicate the state of a namespace and/or content item in server file journal 148 before or after linearized operations 324A, which can help avoid revision conflicts and track the order of revisions before and after linearized operations 324A are applied.

Figure 3C:
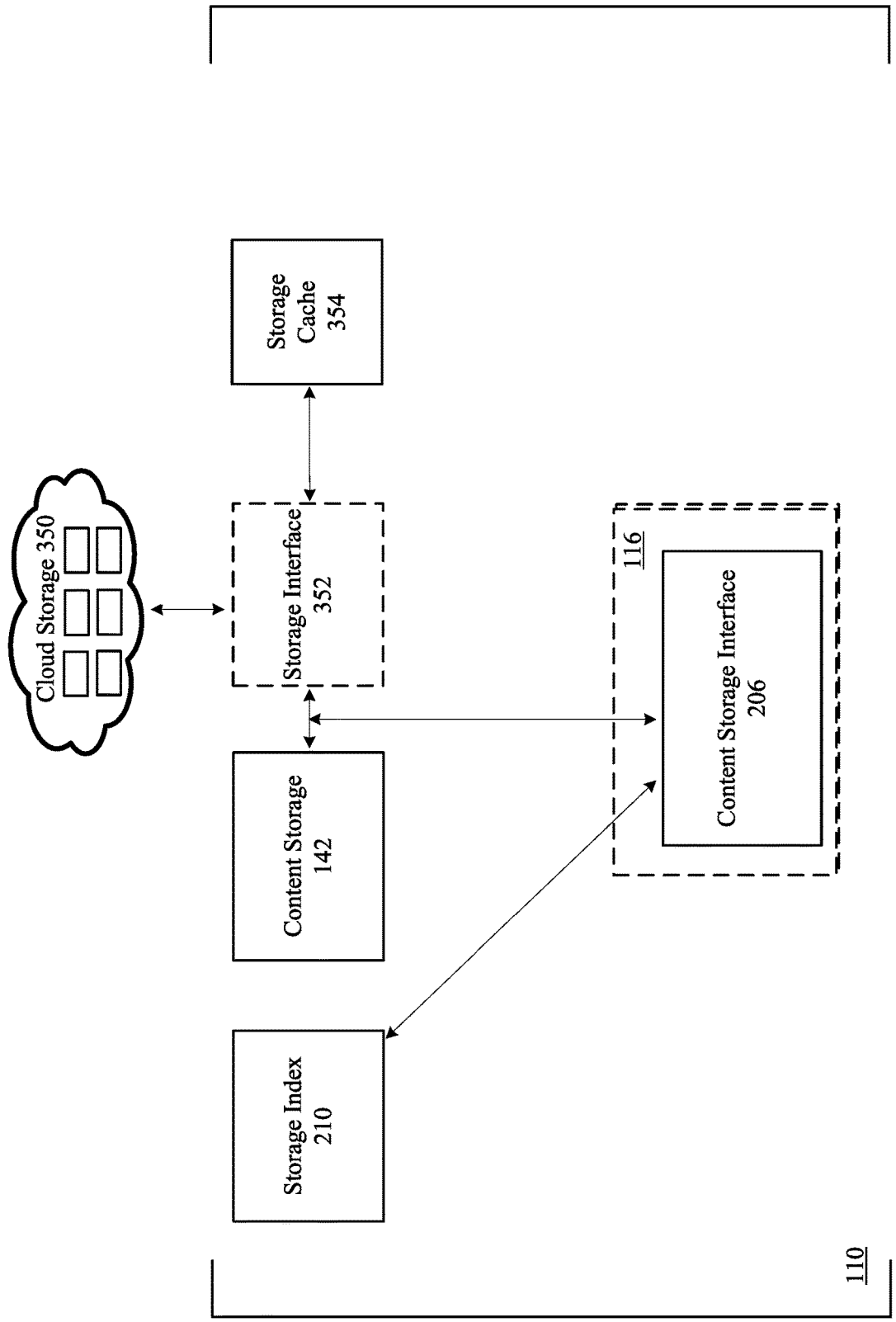
FIG. 3C shows a diagram of an interface for various example content storage systems.

FIG. 3C illustrates an example synchronization architecture for hybrid storage solutions. In this example, content management system 110 includes storage interface 352 which manages storage operations between content storage 142 and cloud storage 350. Cloud storage 350 can be a storage solution implemented in addition to content storage 142. Cloud storage 350 can be a separate storage solution utilized for additional storage capabilities such as, for example, archiving, backup or redundancy, disaster recovery, replication, scalability, etc. In some cases, cloud storage 350 can be a storage provider from a third-party cloud provider. Different cloud providers can implement different platforms with different requirements and guarantees. Storage interface 352 can be platform-agnostic and capable of translating storage operations for any storage platform without sacrificing content storage and synchronization functionality, requirements and guarantees associated with content management system 110.

For example, in some cases, cloud storage 350 may not guarantee order of operations. Failure to provide such guarantees can result in conflicts and inconsistencies based on operations executed out of order. This can be particularly problematic in a high-volume synchronization context. To illustrate, a user may delete file A and later add file A. Without a guarantee of order of operations, cloud storage 350 may add file A first and subsequently delete file A. This may result in file A being deleted from cloud storage 350 and never re-added, potentially causing data loss. Content management system 110, on the other hand, may require order of operations to avoid such problems. Storage interface 352 can allow cloud storage 350 to be implemented while maintaining guarantees of order of operations required by content management system 110.

As another example, content management system 110 may have certain data archiving, recycling, or retention policies that are not supported by cloud storage 350. For example, content management system 110 may have a policy that prevents data accessed or modified within a specific period of time from being deleted, or a policy that requires deleted data to be retained for a particular period of time before permanent deletion. On the other hand, cloud storage 350 may not support such data retention policies. Storage interface 352, however, can allow content management system 110 to implement cloud storage 350 and ensure that such policies are not violated for data stored in cloud storage 350.

Thus, storage interface 352 can serve as an interface or frontend for content storage 142 and cloud storage 350 which translates communications and operations between different storage platforms, provides cross-functionality between content storage 142 and cloud storage 350, and ensures adherence to specific data guarantees and policies by both content storage 142 and cloud storage 350.

Storage interface 352 can store metadata at storage cache 354 about the data in content storage 142 and/or cloud storage 350. Storage interface 352 can use the metadata to track state information and manage data and operations associated with content storage 142 and/or cloud storage 350. Storage interface 352 can query and update storage cache 354 as necessary when processing data jobs and requests for content storage 142 and/or cloud storage 350.

Storage interface 352 can issue commands and/or operations to content storage 142 and cloud storage 350 to add data, get or retrieve data, delete data, update data, etc. For example, storage interface 352 can obtain data requests or jobs and generate specific commands to manage data in content storage 142 and cloud storage 350 according to the data requests or jobs as well as any data guarantees, policies or requirements.

Figure 3D:
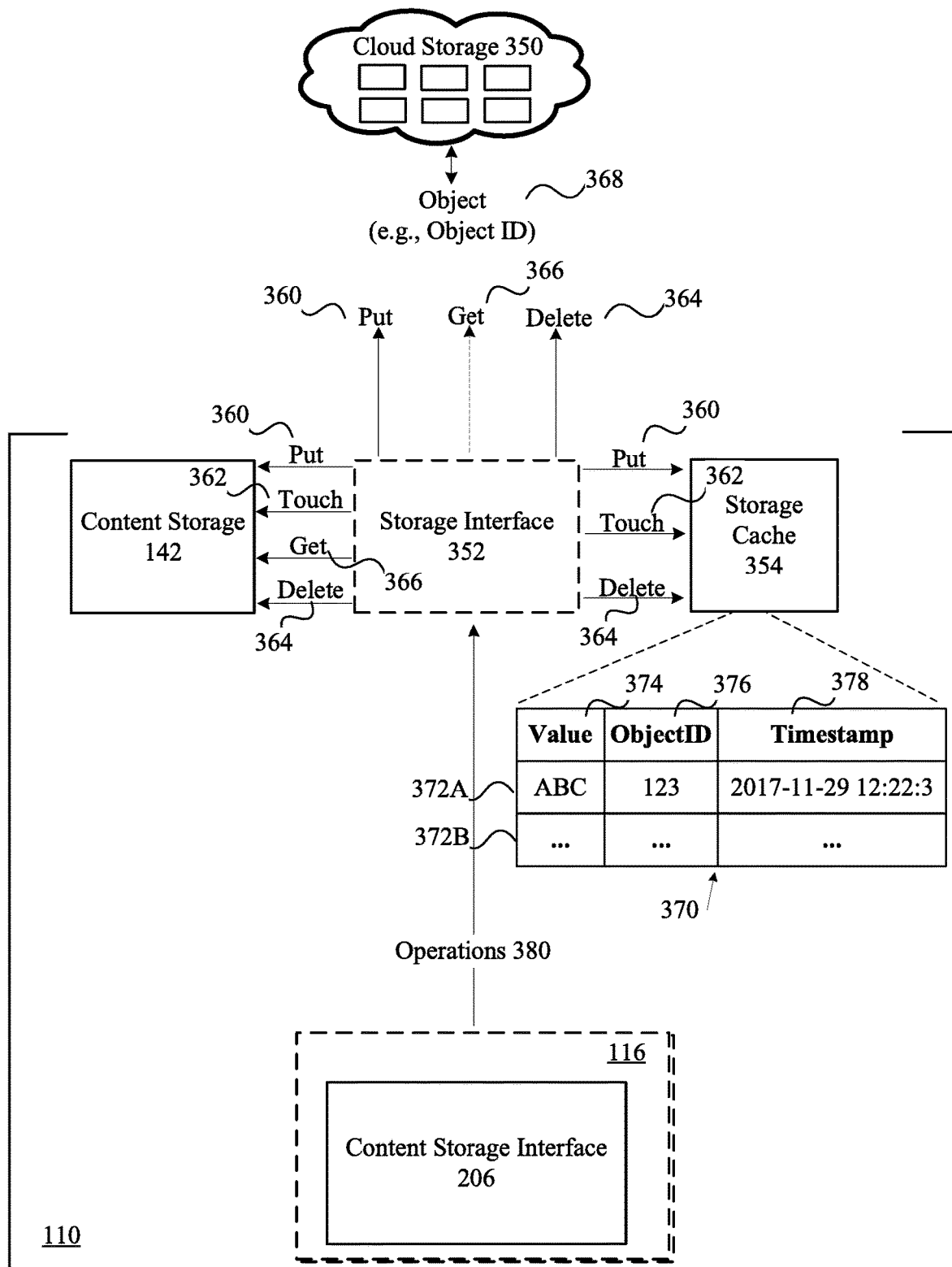
FIG. 3D shows a diagram of an example configuration of an interface for various example content storage systems.

With reference to FIG. 3D, storage interface 352 can function as a front end or interface for content storage 142 and cloud storage 350. For example, storage interface 352 can issue commands 360, 362, 364, 366 to add, delete, edit, etc., data (e.g., blocks 220A, 220B, 220C, 220N) on content storage 142 and cloud storage 350.

Storage interface 352 can send put command 360 to content storage 142 to add or upload data. Put command 360 can include the data (e.g., content items or blocks of content items) to be added to content storage 142, as well as information about put command 360. For example, storage interface 352 can send a key and/or timestamp along with put command 360 to content storage 142. The key can provide security and authentication. The timestamp can be used to guarantee order of operations, log statistics, and comply with retention and recycling policies. Storage interface 352 can also include a token with put command 360 which authenticates put command 360 and/or identifies a location (e.g., region, cluster, zone, etc.) with content storage 142 where the data is located. The token can be a token received from authorization service 132 or file journal interface 202, as shown in FIG. 2A.

Storage interface 352 can issue touch command 362 to update the timestamp of data on content storage 142 and storage cache 354. Touch command 362 can be a variation of put command 360 which involves data already contained in content storage 142 and storage cache 354. Storage interface 352 can issue touch command 362 when it wants to update the timestamp for that data without re-uploading the data. The updated timestamp can renew or update the date and/or time of the data, which can represent the modification time, the creation time, and/or the time of an event associated with the data. In some cases, the timestamp represents the time or date the data was added or modified. Thus, by issuing touch command 362, storage interface 352 can renew the creation or modification time or date associated with the data. The data will thus appear to be more recently added or modified.

The timestamp and updated timestamp can be useful when implementing certain data retention or recycling policies. For example, assume content management system 110 implements a policy that provides that data is retained for at least 30 days and a delete for data newer than 7 days should be rejected. The timestamp of a block of data can then be used to ensure that block is retained for at least 30 days and only deleted if older than 7 days. When storage interface 352 issues put command 360 to add the block to content storage 142, it can include a timestamp identifying when the block was added to content storage 142. The timestamp can track when the block was added and identify the age of the block to ensure the block is not removed within 7 days of being added. If a block is already in content storage 142, storage interface 352 can issue touch command 362 for the block to update its timestamp and thus renew the age of the block. The update to the timestamp can ensure the block is not deleted for at least another 7 days.

Storage interface 352 can also issue get command 366 to retrieve content items from content storage 142, and delete command 364 to delete content items. Storage interface 352 can check the timestamp of a block before issuing or approving delete command 364 for that block. In the example above, if the timestamp indicates the block is newer than 7 days (either because a put command or a touch command was issued for the block within 7 days), storage interface 352 can reject delete command 364. This prevents the block from being deleted if the block is newer than 7 days.

In addition, storage interface 352 can issue put command 360, get command 366, and delete command 364 to add, retrieve and delete data from cloud storage 350. Cloud storage 350 may not guarantee order of operations or enforce specific data retention and archiving policies implemented by content management system 110. Accordingly, to ensure commands 360, 364, 366 to cloud storage 350 are not applied out of order or result in violations of guarantees or policies implemented by content management system 110, storage interface 352 can store information in storage cache 354 about data on cloud storage 350 and/or content storage 142. For example, storage interface 352 can cache and query metadata on storage cache 354 to enforce specific guarantees and policies regarding order of operations, data retention, data archiving, etc. Storage interface 352 can refer to metadata on storage cache 354 to accept, reject, and/or issue commands (e.g., 360, 364, 366) for cloud storage 350 and/or content storage 142.

Storage cache 354 can store table 370 to track metadata about content items in cloud storage 350 and/or content storage 142. Table 370 can include records 372A, 372B representing content items on cloud storage 350 and/or content storage 142. Table 370 can include value field 374, object ID field 376, and timestamp field 378. Value field 374 can store information about a content item. For example, value field 374 can store a hash of a block of data to identify the block in table 370. Storage interface 352 can use the values (e.g., hashes) in value field 374 to query table 370 and determine whether table 370 contains specific content items. Storage interface 352 can thus determine if a content item is stored in content storage 142 by querying table 370 based on a value associated with that content item.

Object ID field 376 can store an object identifier value used by cloud storage 350 to identify content items in cloud storage 350. For example, if a block is added to cloud storage 350, cloud storage 350 can store the block and generate an object identifier for the block, which uniquely identifies the block at cloud storage 350. Storage interface 352 can obtain the object identifier from cloud storage 350, and store the object identifier in object ID field 376 on a specific record in table 370 associated with that block of data. Thus, the value(s) in object ID field 376 can identify content items on cloud storage 350.

Timestamp field 378 can include a timestamp indicating when a content item was added or modified. The timestamp can thus indicate the age (e.g., modification or creation date) of a content item. The timestamps in timestamp field 378 can be used to enforce guarantees and policies for content items stored on cloud storage 350.

As previously mentioned, records 372A, 372B on table 370 represent content items stored on cloud storage 350 and content storage 142. Storage interface 352 can send commands 360, 362, 364 to storage cache 354 to add, edit, or delete records 372A, 372B, and manage data on table 370. Storage interface 352 can also query storage cache 354 (e.g., table 370) to approve, reject, and/or issue commands (e.g., 360, 362, 364, 366) to cloud storage 350 and/or content storage 142 and manage content items stored in cloud storage 350 and/or content storage 142.

For example, storage interface 352 can send put command 360 to add a content item (e.g., block) to cloud storage 350 and/or content storage 142. Content storage 142 receives put command 360 and stores the associated content item. Similarly, cloud storage 350 receives put command 360 and stores the associated content item. Cloud storage 350 also generates object data 368 and sends object data 368 to storage interface 352. Object data 368 can include an object ID of the content item that uniquely identifies the content item at cloud storage 350. In some cases, object data 368 can also include other information, such as a modification date for the content item, storage information, etc.

Storage interface 352 can also send put command 360 to storage cache 354 to add record 372A on table 370 representing the content item added to cloud storage 350 and/or content storage 142. Storage cache 354 can receive put command 360 and create record 372A for the content item, including the object ID of the content item from cloud storage 350 as well as a value for the content item (e.g., a hash) for value field 374, which can identify the content item at content storage 142. For example, storage cache 354 can receive put command 360 and record row 372A on table 370 and add the value (e.g., hash) "ABC" of the content item in value field 374, the object ID "123" of the content item in object ID field 376, and a timestamp in timestamp field 378 indicating the date/time the content item was added. In this example, record 372A can thus indicate that the content item associated with value "ABC" and object ID "123" was added (e.g., added) at the time indicated by the timestamp in timestamp field 378. Storage interface 352 can query table 370 and determine based on record 372A that the content item associated with value "ABC" and object ID "123" is stored on content storage 142 and cloud storage 350.

Storage interface 352 can send touch command 362 to storage cache 354 to update the timestamp in record 372A of table 370 for the content item. In this example, storage interface 352 can send touch command 362 to storage cache 354 to update the timestamp in row 372A for the content item associated with value "ABC" and object ID "123". The updated timestamp can renew the age of the content item (e.g., creation or modification date). Storage interface 352 can send touch command 362 to storage cache 354 to update the timestamp of a content item as desired. For example, storage interface can send touch command 362 to update a timestamp of a content item before the content item is eligible for deletion, in order to extend the amount of time before the content item is eligible for deletion. As another example, if a put command (e.g., 360) is sent to cloud storage 350 for the content item and the content item is already in content storage 142 and/or storage cache 354 (e.g., table 370), storage interface 352 can issue touch command 362 to storage cache 354 in order to update the timestamp in record 372A of table 370 for the content item without having to create a new record in table 370 for that content item.

Storage interface 352 can check the timestamp of a content item in table 370 before deleting the content item from cloud storage 350 and/or content storage 142, to ensure the delete does not violate a specific policy or guarantee provided by content management system 110. For example, assume content management system 110 has a policy that prevents blocks newer than 7 days from being deleted from cloud storage 350. In addition, assume storage interface 352 receives operations 380, which includes a batch of operations (e.g., 360, 364, 366) associated with one or more content items. The batch of operations in operations 380 includes delete command 364 for content item "ABC". To ensure compliance with the example retention policy, before sending delete command 364 to cloud storage 350 to delete content item "ABC" on cloud storage 350, storage interface 352 can check the timestamp associated with the content item in record 372A of table 370 on storage cache 354.

If the timestamp is newer than 7 days, storage interface 352 can determine the content item "ABC" is not eligible for deletion and reject delete command 364 for content item "ABC". Thus, storage interface 352 can forego sending delete command 364 for content item "ABC" to cloud storage 350. In some cases, storage interface 352 can also send touch command 362 for content item "ABC" to storage cache 354 in order to update the timestamp of content item "ABC" at table 370 and extend the period before content item "ABC" becomes eligible for deletion. The updated timestamp can thus prevent the content item "ABC" from being deleted for another 7 days.

On the other hand, if the timestamp is older than 7 days, storage interface 352 can accept delete command 364 for the content item "ABC". Storage interface 352 can then send delete command 364 for the content item "ABC" to cloud storage 350 and/or content storage 142, to delete the content item "ABC" from cloud storage 350 and/or content storage 142. Storage interface 352 can also send delete command 364 to storage cache 354 to remove record 372A in table 370 for the content item "ABC". In some cases, before deleting record 372A in table 370, storage interface 352 can lock record 372A until delete command 364 is sent to cloud storage 350 and/or content storage 142 and/or the content item "ABC" is deleted from cloud storage 350 and/or content storage 142. Record 372A can remain locked until it is deleted to prevent an intervening update, such as a put or touch operation, for the content item "ABC". Once delete command 364 is sent to cloud storage 350 and/or content storage 142 or the content item "ABC" is deleted from cloud storage 350 and/or content storage 142, record 372A in table 370 can be removed.

The locking and deleting of records in table 370, the timestamps in table 370, as well as the retention policies of content management system 110 can prevent the content item "ABC" from being put or deleted out of order. For example, assume operations 380 include a put and delete command (360, 364) for the content item "ABC". The put and delete commands (360, 364) can create a race condition. Storage interface 352 can query storage cache 354 and use the timestamp of the content item "ABC" in table 370 to ensure the put and delete commands are not processed out of order or do not violate the retention policies of content management system 110.

For example, if put command 360 is processed before delete command 364, put command 360 will cause the timestamp of the content item "ABC" to be updated. Thus, when delete command 364 is later processed, storage interface 352 can determine based on the timestamp that the content item "ABC" is not eligible for deletion and reject delete command 364. If delete command 364 is instead processed before put command 360, storage interface 352 will either delete the content item "ABC" if older than 7 days or reject delete command 364 if the content item "ABC" is newer than 7 days. In either case, put command 360 when later processed will put the content item "ABC".

If delete command 364 was generated before put command 360 but processed out of order, after put command 360, storage interface 352 will reject delete command 364 when processing based on the timestamp of the content item "ABC", which would have been updated by put command 360 and thus rendered the content item "ABC" ineligible for deletion under the example 7-day policy. If instead put command 360 was generated before delete command 364 but processed out of order, after delete command 364, put command 360 will put the content item "ABC" back after delete command 364 (if approved), causing the same result as if put command 360 is processed before delete command 364 since put command 360 would update the timestamp and cause delete command 364 to be rejected. Therefore, storage interface 352 can prevent put command 360 and delete command 364 to be processed out of order and create an incorrect result in a race condition.

When storage interface 352 issues delete command 364 for the content item "ABC", it can lock record 372A to prevent an intervening put command from being processed and applied while the content item "ABC" is being deleted. For example, storage interface 352 can lock record 372A while processing delete command 364 for the content item "ABC". If storage interface 352 receives put command 360 for the content item "ABC" while record 372A is locked, storage interface 352 will not modify record 372A based on put command 360, and thus prevent a conflict between the delete being processed and the put received while the delete is processed. In some cases, a put issued while the content item's record in table 370 is locked, the put can be rejected. After the content item is deleted from cloud storage 350 and/or content storage 142, the locked record for that content item can be deleted from table 370. Once the record is deleted, table 370 will not have a record for the object ID associated with that content item. Thus, when storage interface 352 queries table 370 for that content item based on the object ID, it will not find a record for the object ID and determine that the content item is not on cloud storage 350. A put received for that content item will either yield an error or a new object ID from cloud storage 350.

When storage interface 352 needs to determine if a content item is stored on cloud storage 350 and/or content storage 142, it can perform a lookup for that content item in table 370 at storage cache 354. For example, storage interface 352 can query table 370 with the hash and/or object ID of a block to determine if that block is available in table 370 of storage cache 354. If the block is not in table 370, storage interface 352 can determine that the block is not on cloud storage 350 and/or content storage 142. By contrast, if the block is found in table 370, storage interface 352 can determine that the block is stored on cloud storage 350 and/or content storage 142.

Storage interface 352 can query table 370 when performing vacuuming or recycling operations to remove data on cloud storage 350 and/or content storage 142. Storage interface 352 can check the timestamps in table 370 to determine if the associated content items can be removed based on the data policies at content management system 110. Storage interface 352 can also issue touch command 362 to storage cache 354 as previously explained to update the timestamp of one or more content items in table 370, in order to prevent those content items from being removed by a delete, vacuuming or recycling operation.

Figure 4A:
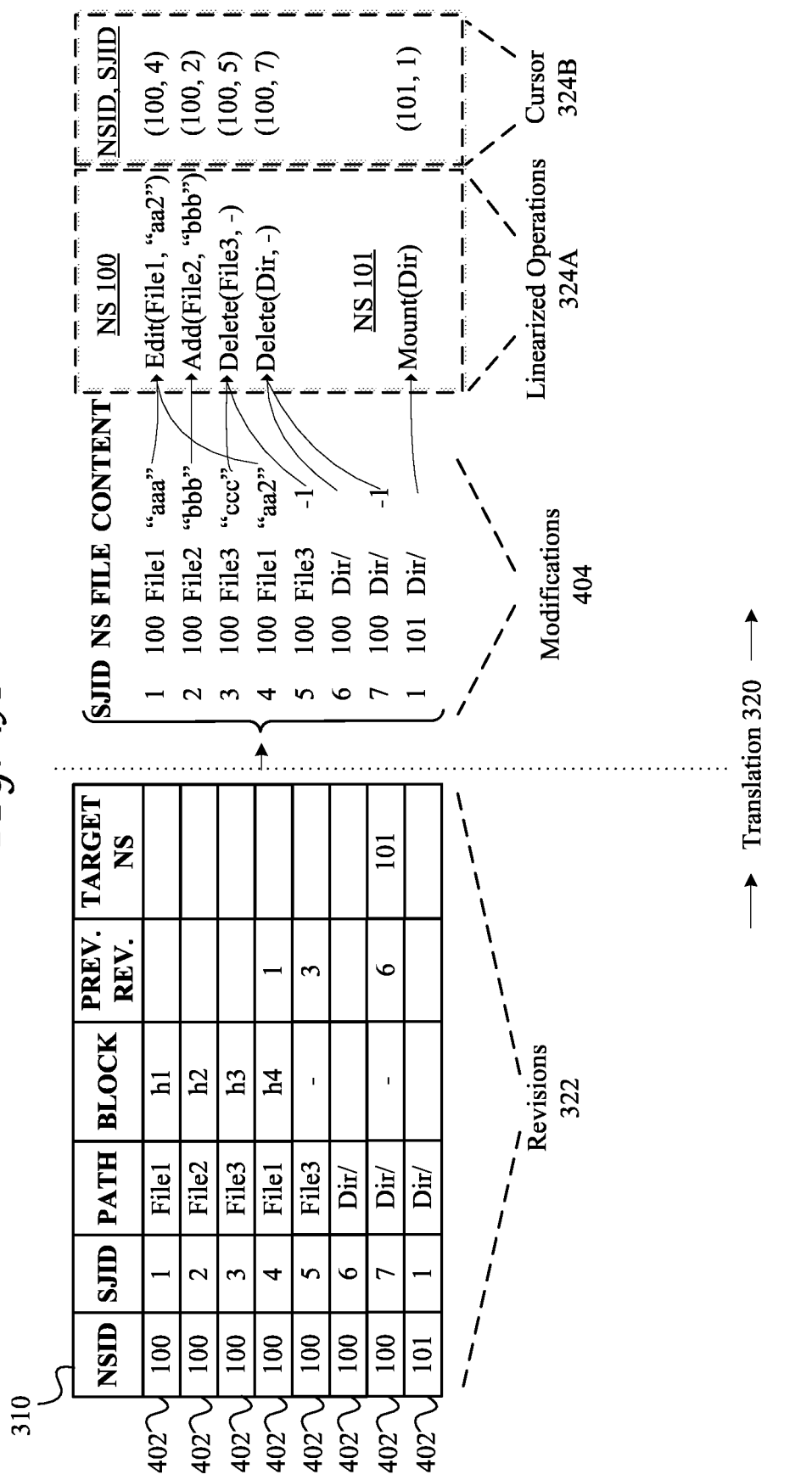
FIG. 4A shows a diagram of an example translation and linearization process for translating server file journal data to linearized operations.

FIG. 4A illustrates a diagram of an example translation and linearization process for translating server file journal data to linearized operations. Server file journal 148 stores journal 310 including rows 402 which include revisions 322. In this example, journal 310 tracks revisions (322) for multiple namespaces, namely namespaces 100 and 101 (i.e., NSIDs 100 and 101). However, in some cases, server file journal 148 can store namespace-specific journals that track revisions specific to respective namespaces. The rows (e.g., rows 402) in a namespace-specific journal include data specific to that namespace, and each row reflects a revision specific to that namespace.

Each row (402) in journal 310 includes a namespace identifier field (NSID) for uniquely identifying a namespace associated with that row, a server journal identifier field (SJID) that includes monotonically increasing values which map to a row in a given namespace and provides an ordering of operations or revisions within that namespace. Journal 310 also includes a path field (Path) for identifying a namespace-relative path of a content item, a block field (Block) for identifying a block or blocklist associated with the content item, a previous revision field (Prev_Rev) for identifying the row (i.e., SJID) in journal 310 that represents the previous state or revision of the content item, and a target namespace field (Target NS) for identifying a target namespace for a mount point of a mounted namespace (if the row corresponds to a mount). There is no data for the Target NS field for rows (e.g., revisions) which do not correspond to mount points.

The first of rows 402 in journal 310 identifies the first revision (SJID 1) for "File1" (Path field value File1) in namespace "100" (NSID 100), which corresponds to block "h1" and has no previous revisions (Prev_Rev) or target namespaces (Target NS). Since the row does not include a previous revision or a target namespace, the revision represented by the row corresponds to an addition at namespace "100" of "File1" associated with block "h1". The row in journal 310 containing SJID "4" represents the last revision in journal 310 for "File1" on namespace "100", since this row is the last row or SJID in journal 310 corresponding to "File1" on namespace "100". This row containing SJID "4" indicates that "File1" on namespace "100" was edited after being added in SJID "1", and the edit corresponds to block "h4".

Modifications 404 depict an example of modifications representing revisions 322. In this example, each of modifications 404 illustrates a content revision from a corresponding row (402) in journal 310. Each modification corresponds to an SJID and NSID in journal 310, and a file associated with the corresponding SJID and NSID in journal 310. In this example, the content associated with modifications 404 represents example content values of the blocks (e.g., "h1", "h2", "h3", "h4") in journal 310. The content values in modifications 404 are provided for illustration purposes to depict example modifications to content associated with each revision.

For example, the first modification in modifications 404 represents SJID "1" and NSID "100" in journal 310, and depicts "File1" in namespace "100" being added. Content "aaa" represents a value of "h1" for "File1" at SJID "1" of NSID "100". Modifications 404 also depict an edit of "File1" in namespace "100" representing SJID "4" and NSID "100" in journal 310, which illustrates the content "aaa" (e.g., "h1") associated with "File1" in namespace "100" being modified to "aa2" (e.g., "h4").

In translation 320, revisions 322 from rows 402 in journal 310 are converted to linearized operations 324A. Linearized operations 324A are generated from revisions 322 in journal 310 and represent modifications 404 after linearization. As illustrated by linearized operations 324A, an operation in linearized operations 324A can be based on multiple revisions (322) and/or modifications (404), or a single revision (322) and/or modification (404).

For example, modifications 404 depict a revision adding "File1" to namespace "100", which corresponds to SJID "1" and NSID "100" in journal 310, and a revision editing "File1" in namespace "100", which corresponds to SJID "4" and NSID "100" in journal 310. The add revision can be inferred from the content value "aaa" (e.g., "h1") associated with "File1" and NSID "100" and the lack of any previous revisions for "File1" and NSID "100". In other words, the content "aaa" indicates that content (e.g., "h1") was either added or edited, and the lack of a previous revision for "File1" and NSID "100" suggests that the content "aaa" represents content (e.g., "h1") being added as opposed to edited. The edit revision can be inferred from the content value "aa2" (e.g., "h4") associated with "File1" and NSID "100" and the previous revision (SJID "1" and NSID "100") associated with "File1" and NSID "100". In other words, the change from content "aaa" to "aa2" associated with "File1" and NSID "100" suggests that the content "aa2" represents an edit.

In linearized operations 324A, the add and edit modifications (404) corresponding to SJID "1" and SJID "4" for NSID "100" can be converted into a single linearized operation (Edit operation) which edits the content value associated with "File1" from "aaa" (e.g., "h1") to "aa2" (e.g., "h4"). The single linearized operation editing content (e.g., "h1") of "File1" to "aa2" (e.g., "h4") reflects the modification adding "File1" associated with content "aaa" (e.g., "h1") to namespace "100", as well as the modification editing content "aaa" (e.g., "h1") associated with "File1" in namespace "100" to "aa2" (e.g., "h4"). Accordingly, this linearized operation is based on two modifications 404 and two corresponding revisions in revisions 322.

The modification in modifications 404 corresponding to SJID "2" and NSID "100" in journal 310 represents a revision adding "File2" associated with content "bbb" (e.g., "h2") to namespace "100". This modification represents the only revision 322 from journal 310 corresponding to "File2" on namespace "100". Accordingly, linearized operations 324A include a single operation for "File2" on namespace "100", which adds "File2" associated with content "bbb" (e.g., "h2") to namespace "100" and is based on a single modification 404 (add of "File2" on namespace "100") and revision 322.

Modifications 404 in this example also include for a modification adding "File3" associated with content "ccc" (e.g., "h3") to namespace "100", which corresponds to SJID "3" and NSID "100" in journal 310, and a delete (represented as "−1") of "File3" from namespace "100", which corresponds to SJID "5" and NSID "100" in journal 310. Thus, revisions 322 include two modifications 404 associated with "File3" on namespace "100". Since the last revision in journal 310 associated with "File3" and namespace "100" corresponds to the delete modification representing SJID "5" and NSID "100" in journal 310, the add and delete modifications 404 associated with "File3" and namespace "100" from revisions 322 can be linearized to a single operation deleting "File3" from namespace "100". Accordingly, linearized operations 324A include a single operation for "File3" and namespace "100", which is the single operation deleting "File3" from namespace "100".

SJIDs "6" and "7" for NSID "100" and SJID "1" for NSID "101" in journal 310 represent "Dir" being added to namespace "100" and later moved from namespace "100" to namespace "101". For example, SJID "6" and NSID "100" identifies "Dir" and namespace "100" and does not include a previous revision, which indicates "Dir" was added to namespace "100" at SJID "6". SJID "7" identifies "Dir" being moved from namespace "100" to namespace "101", as reflected by the block field ("-"), the previous revision field (SJID "6"), and the target namespace field ("101"). SJID "1" for NSID "101" then identifies "Dir" being added to namespace "101", as indicated by the lack of prior rows or revisions for "Dir" and namespace "101". The add and move revisions in SJIDs "6" and "7" in NSID "100" and SJID "1" in NSID "8" are depicted by three modifications 404: an add of "Dir" to namespace "100" which corresponds to SJID "6" and NSID "100", a delete of "Dir" from namespace "100" which corresponds to SJID "7" and NSID "100", and an add of "Dir" to namespace "101" which corresponds to SJID "1" and NSID "101".

The add and delete modifications 404 of "Dir" and namespace "100", which respectively correspond to SJIDs "6" and "7" of NSID "100" in journal 310, are linearized to a single operation deleting "Dir" from namespace "100, since the last revision in journal 310 corresponding to "Dir" and namespace "100" is a delete of "Dir" from namespace "100" at SJID "7" and NSID "100". The add of "Dir" to namespace "101", which corresponds to SJID "1" and NSID "101" in journal 310, is the only modification 404 and revision 322 corresponding to "Dir" and namespace "101". Accordingly, the add is provided in linearized operations 324A as a single mount operation for "Dir" and namespace "101". Therefore, the three modifications 404 from revisions 322 corresponding to SJIDs "6" and "7" in NSID "100" and SJID "1" in NSID "101" (i.e., the add and delete of "Dir" on namespace "100", and the add of "Dir" on namespace "101"), are linearized to two operations in linearized operations 324A: a delete operation for "Dir" in namespace "100" and a mount operation for "Dir" in namespace "101".

As illustrated above, linearized operations 324A include an edit operation for "File1" and namespace "100", an add operation for "File2" and namespace "100", a delete operation of "File3" in namespace "100", a delete operation for "Dir" in namespace "100", and a mount operation for adding "Dir" to namespace "101". These operations in linearized operations 324A are generated from revisions 322 and reflect the latest state of each content item in journal 310. File journal interface 202 can generate linearized operations 324A and send linearized operations 324A to client device 150 to ensure client device 150 contains the latest state from revisions 322 in journal 310.

When providing linearized operations 324A to client device 150, file journal interface 202 can include cursor 324B along with linearized operations 324A to client device 150. Cursor 324B can identify the last revision (SJID) for each namespace (NSID) in journal 310. In some embodiments, cursor 324B can also include an FSAuth token including the user ID, and the last observed access permissions to the NSID provided in the cursor. The last revision for each namespace can indicate a position in journal 310 corresponding to the latest revisions sent to client device 150 for each namespace.

In some cases, cursor 324B can also map each operation in linearized operations 324A to a namespace (NSID) and row (SJID) in journal 310. The namespace and row associated with an operation can indicate the position in journal 310 corresponding to the operation. In other words, the namespace and row associated with an operation can indicate the revision number in journal 310 represented by that operation. The namespaces and rows in cursor 324B correspond to the latest state in journal 310 for each namespace and content item associated with linearized operations 324A. Cursor 324B can provided to client device 150 as a tool for client device 150 to identify to file journal interface 202 the latest state or revisions obtained by client device 150 for one or more namespaces and/or content items when attempting to apply changes (e.g., via operations data 302) from client device 150 to the one or more namespaces and/or content items. When file journal interface 202 receives cursor 324B from client device 150, it can use cursor 324B to identify the position of client device 150 at journal 310 (e.g., the latest revisions from journal 310 obtained by client device 150) and detect or avoid conflicts caused by operations from client device 150.

For example, if file journal interface 202 receives an operation from client device 150 modifying "File1" in namespace "100", file journal interface 202 can use cursor 324B, which it receives from client device 150 along with the operation, to check whether journal 310 has any newer revisions for "File1" in namespace "100" than the revision identified in cursor 324B from client device 150. If the revision in cursor 324B is the most current revision in journal 310, file journal interface 202 can commit the edit operation as a new revision in journal 310 (e.g., SJID "8" in NSID "100") for "File1" in namespace "100".

Alternatively, if the revision in cursor 324B is not the most current revision in journal 310 for "File1" in namespace "100", file journal interface 202 can determine that the edit operation from client device 150 is not based on the most current version in journal 310 for "File1" in namespace "100". For example, if cursor 324B identifies SJID "4" and NSID "100" in journal 310 and file journal interface 202 determines that journal 310 includes a revision at SJID "12" and NSID "100" for "File1" in namespace "100", file journal interface 202 can determine that the edit operation from client device 150 pertains to an older version of "File1" on namespace "100" (e.g., SJID "4" and NSID "100"), and the edit operation can create a conflict as it edits a file that has since been modified. File journal interface 202 can detect this conflict created by the edit operation and reject the edit operation, attempt to reconcile the conflict, or provide the latest revisions to client device 150 and allow client device 150 to reconcile the conflict.

Each time file journal interface 202 sends linearized operations to client device 150, it can include a cursor as described here which identifies a respective position in journal 310 for each namespace and/or content item. Similarly, any time client device 150 sends an operation to file journal interface 202, it can include its latest cursor which file journal interface 202 can use to map the state at client device 150 with the state at journal 310.

Journal 310 in this example depicts a journal with multiple namespaces. As previously noted, in some examples, server file journal 148 can maintain namespace-specific journals. Cursor 324B may include an SJID and NSID for each namespace, to indicate the latest revision for each namespace. Based on cursor 324B, file journal interface 200 can query multiple journals, in embodiments where multiple journals are maintained, and/or retrieve revisions from multiple journals, as further explained herein.

Figure 4B:
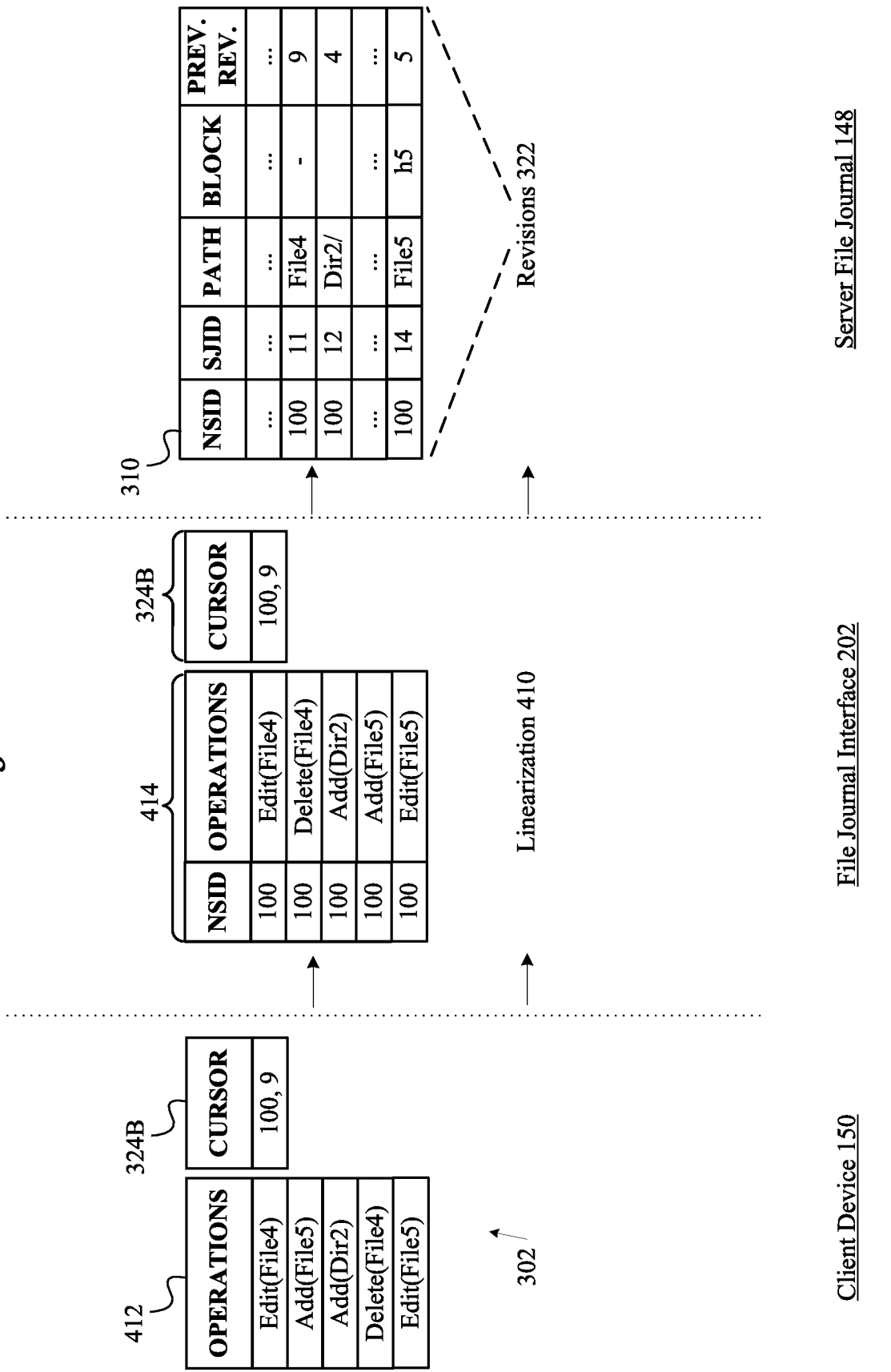
FIG. 4B shows a diagram of an example translation and linearization process for translating operations from a client device to revisions for a server file journal.

FIG. 4B illustrates a diagram of an example process for linearization 410 to convert operations data 302 from client device 150 to revisions 322 for journal 310 at server file journal 148. Client device 150 can provide operations data 302 to file journal interface 202. Operations data 302 in this example includes operations 412 at client device 150, such as content item edit, add, rename, move, mount, or delete operations. In some cases, operations 412 can include multiple operations to a same content item. For example, operations 412 can include an operation editing "File4" on namespace "100" and an operation deleting "File4" from namespace "100".

Operations data 302 also includes cursor 324B previously received by client device 150 from file journal interface 202. Cursor 324B can identify the state (e.g., NSID and SJID) or latest revisions in journal 310 for one or more namespaces and/or content items. Client device 150 can provide cursor 324B to file journal interface 202 as a reference point for operations 412. In this example, cursor 324B provides the latest state for namespace "100", which is represented by SJID "9".

In some cases, the cursor is cryptographically signed by content management system 110, which allows file journal interface 202 to determine that the cursor has not been tampered with. Further, since client device 150 commit revisions to server file journal 148 when it has received the most recent revisions from server file journal 148 for the namespace, file journal interface 202 can accept that the last observed access permissions to the NSID are still valid, and therefore client device 150 has access to the namespace.

File journal interface 202 can receive operations 412 and cursor 324B and perform linearization 410, to linearize and transform operations 412 from client device 150 to revisions 322 for journal 310. Based on operations 412, file journal interface 202 can generate log 414 of operations. Log 414 can include a list of operations from operations 412 mapped to respective namespace(s) in journal 310. In some cases, log 414 can include linearized operations (324A) generated from operations 412 as previously explained.

File journal interface 202 can use cursor 324B to verify that operations 412 reflect the latest state or revisions in journal 310 before updating journal 310 to reflect the operations in log 414. If file journal interface 202 confirms that cursor 324B reflects the latest state or revisions in journal 310 for the namespaces and/or content items associated with log 414, file journal interface 202 can add revisions 322 to journal 310 based on log 414. Revisions 322 can include the latest state or revision of each content item and/or namespace associated with the operations in log 414.

The operations in log 414 include an add and edit operation for "File5". Accordingly, revisions 322 include the edit of "File5", which file journal interface 202 can write to journal 310 as the latest state of "File5" (i.e., the state after the add and edit operations are applied to "File5" in a linearized fashion). The operations in log 414 also include an add operation for "Dir2" as well as edit and delete operations for "File4" on namespace "100". Revisions 322 can thus include an operation adding "Dir2" to namespace "100" and an operation deleting "File4" from namespace "100" as the latest state of "Dir2" and "File4" respectively.

In FIG. 4B, the revisions (322) depicted in journal 310 reflect the latest state of each content item ("File4", "File5", "Dir2") associated with operations 412. However, it should be noted that, in some cases, file journal interface 202 can write every revision represented by log 414 to journal 310 in order to reflect not only the latest state revision of each namespace and/or content item resulting from log 414, but also any previous states or revisions leading up to the latest state or revision. For example, file journal interface 202 can write a revision in journal 310 for the edit of "File4" and a subsequent revision for the delete of "File4", as opposed to only writing the edit of "File4" reflecting the latest state from operations 412, to indicate in journal 310 the full sequence of revisions of "File4" from operations 412.

File journal interface 202 can transform operations in log 414 to revisions 322 and update journal 310 to include revisions 322. File journal interface 202 can write revisions 322 to journal 310 at respective rows in journal 310. File journal interface 202 can add revisions 322 to the next available rows (e.g., SJIDs) in journal 310. In some cases, file journal interface 202 can add revisions 322 based on a relative order which can be determined based on linearization 410 and/or respective timestamps or clocks.

As shown in FIG. 4B, the delete operation of "File4" in namespace "100" is included in row "11" or SJID "11" for namespace "100". The revision in SJID "11" of journal 310 indicates that "File4" in namespace "100" has been deleted, as reflected by the minus symbol in the block field, and identifies SJID "9" as the previous revision in journal 310 for "File4" in namespace "100". The addition of "Dir2" and edit of "File5" are included respectively in rows or SJIDs 12 and 14.

Journal 310 in FIG. 4B has been updated to include revisions 322 based on log 414 and cursor 324B, to reflect the state of each content item modified in log 414. The path field at each row in journal 310 identifies a content item within the associated namespace (e.g., namespace "100"). The path field of a row is based on the file and namespace from a corresponding operation in log 414. The block field in journal 310 represents the content item. In some cases, the block field can include a hash of a respective content item or data block. The block field can be empty if the content item has been deleted and/or is a directory, folder, mount, etc.

When updating journal 310 to include revisions 322 based on log 414 and cursor 324B, translation service 204 can identify the path of each content item to include in the path field of journal 310. In some cases, translation service 204 can translate an identifier of a content item (e.g., File ID) to a path of the content item (e.g., /directory/filename). For example, client device 150 can use identifiers to identify content items (e.g., content items in operations data 302) without having to track or calculate respective paths for the content items. Journal 310 may instead use a content item's path to identify the content item. Translation service 204 can use the identifiers of content items from client device 150 to calculate the paths of the content items for journal 310, and update journal 310 using the paths calculated for the content items. Translation service 204 can also perform a reverse translation to obtain a content item's identifier based on the content item's path, and use the content item's identifier when referencing the content item in communications with client device 150.

For example, translation service 204 can use the path in journal 310, NSID in journal 310, and/or a directory field in journal 310 (or elsewhere in server file journal 148) to identify a content item and obtain an identifier (e.g., File ID) of that content item. If file journal interface 202 sends an update or information to client device 150 pertaining to that content item, file journal interface 202 can provide the identifier of the content item to client device 150, which client device 150 can use to identify the content item with or without the path of the content item.

As previously mentioned, before writing revisions 322 to journal 310 from operations 412, file journal interface 202 can check if cursor 324B reflects the latest state or revision in journal 310 for each namespace and/or content item associated with operations 412. In some cases, after confirming that cursor 324B reflects the latest state or revisions in journal 310, file journal interface 202 can also perform a second check to ensure that a revision generated from operations 412 will not conflict with an existing revision in journal 310. For example, if SJID "5" in namespace "100" at journal 310 represents a delete operation of "File5", the edit revision 322 of "File5" depicted in SJID "14" emitted from operations 412 received by file journal interface 202 from client device 150 would create a conflict by attempting to edit "File5" even though "File5" was deleted at SJID "5". Thus, file journal interface 202 can reject the edit operation and revision in this example, and communicate to client device 150 that the edit operation is invalid. File journal interface 202 can update cursor 324B and provide the updated cursor to client device 150 to inform client device 150 of the latest state or revision in journal 310 for "File5" (and any other content item) as necessary.

FIG. 5 illustrates a diagram of an example linearization of cross-namespace operations. Cross-namespace linearization and cross-shard or cross-namespace listing can be performed via clock ordering. Tables 502A, 502B (collectively "502") illustrate a batch of cross-namespace operations for linearization. Tables 502A, 502B respectively include columns 506A, 508A, which are namespace (NSID) fields for identifying a namespace for the records in tables 502A, 502B, columns 506B, 508B are SJID fields for identifying rows or SJIDs in tables 502A, 502B for respective namespaces in columns 506A, 508A, columns 506C, 508C are operations fields for identifying operations associated with each SJID, and columns 506D, 508D are clock fields for identifying a timestamp associated with the operations in columns 506C, 508C.

In this example, table 502A depicts SJIDs "100" and "101" for NSID "1". SJID "100" is associated with an operation adding "foo.txt" to namespace "1" at timestamp "1000", and SJID "101" is associated with an operation mounting namespace "2" at timestamp "1001". Table 502B depicts SJIDs "1" and "2" for NSID "2". SJID "1" is associated with an operation adding "bar.txt" to namespace "2" at timestamp "500", and SJID "2" is associated with an operation editing "bar.txt" at timestamp "1002".

A linearizer (e.g., translation service 204) can obtain the batch of operations in tables 502 and emit a single stream of operations (512) with a cursor (514). The linearizer can identify all namespaces having at least one operation in tables 502 and linearize the operations for all namespaces based on the respective timestamps, NSIDs, SJIDs. In this example, the batch of operations in tables 502 linearize to the stream of operations shown in table 504.

Table 504 includes NSID column 510 which includes NSID fields for identifying the namespace of each operation, operations column 512 which includes operation fields for identifying the operations in table 504, and cursor column 514 which includes cursor fields for identifying a cursor state for each operation. Row 504A in table 504 includes the add operation from SJID "100" of namespace "1" in table 502A. The cursor state in cursor column 514 for row 504A is namespace "1" and SJID "100", which indicates the add operation corresponds to SJID "100" in namespace "1" shown in table 502A. Row 504B in table 504 does not include a value in NSID column 510 or operations column 512, but updates the cursor state in cursor column 514 to include a cross-namespace cursor state, which in this example adds SJID "0" for namespace "2".

Row 504C in table 504 includes the add operation from SJID "1" in namespace "2" shown in table 502A. The cursor state in cursor column 514 for row 504C includes the respective SJIDs "100" and "1" for namespaces "1" and "2" associated with the add operation in row 504C. As shown, the cursor state indicates the cursor is at SJID "100" in namespace "1" and SJID "1" in namespace "2". In other words, the row or SJID in namespace "1" has not increased as the add operation does not affect the state of namespace "1", but the row or SJID in namespace "2" has increased by one as the add operation represents a revision in namespace "2" and affects the state of namespace "2". Thus, the cursor state in row 504C tracks the respective SJIDs for namespace "1" and namespace "2" after the add operation at SJID "1" in namespace "2".

Row 504D in table 504 includes the mount operation at SJID "101" and namespace "1" at table 502A. The mount operation mounts namespace "2" at namespace "1". The mount operation increases the SJID in namespace "1" from "100" to "101", but does not increase the SJID in namespace "2". Accordingly, the cursor state in cursor column 514 for row 504D includes SJID "101" for namespace "1" and remains SJID "1" for namespace "2". This cursor state reflects the state and/or order at namespaces "1" and "2".

Row 504E in table 504 includes the edit operation at SJID "2" and namespace "2" in table 502A, which according to the respective timestamps of the mount and edit operations, is after the mount operation at SJID "101" in namespace "1". The cursor state in cursor column 514 of row 504E maintains the cursor state for namespace "1" at SJID "101" but increases the cursor state for namespace "2" to SJID "2".

As illustrated in table 504, operations 512 are listed as a stream of operations linearized based on causality and timestamps across namespaces "1" and "2". Once operations 512 are linearized in table 504 to reflect cross-namespace causality and sequencing, operations 512 can be converted to revisions in server file journal 148 (e.g., revisions 322 in journal 400) and written to server file journal 148.

For example, a journal for namespace "1" in server file journal 148 can be updated to include a revision at SJID "100" representing the add operation adding "foo.txt" to namespace "1", and a revision at SJID "101" representing the mount operation mounting namespace "2" on namespace "1". Moreover, a journal for namespace "2" in server file journal 148 can be updated to include a revision at SJID "1" representing the add operation adding "bar.txt" to namespace "2", and a revision at SJID "2" representing the edit operation editing "bar.txt" on namespace "2".

Figure 5A:
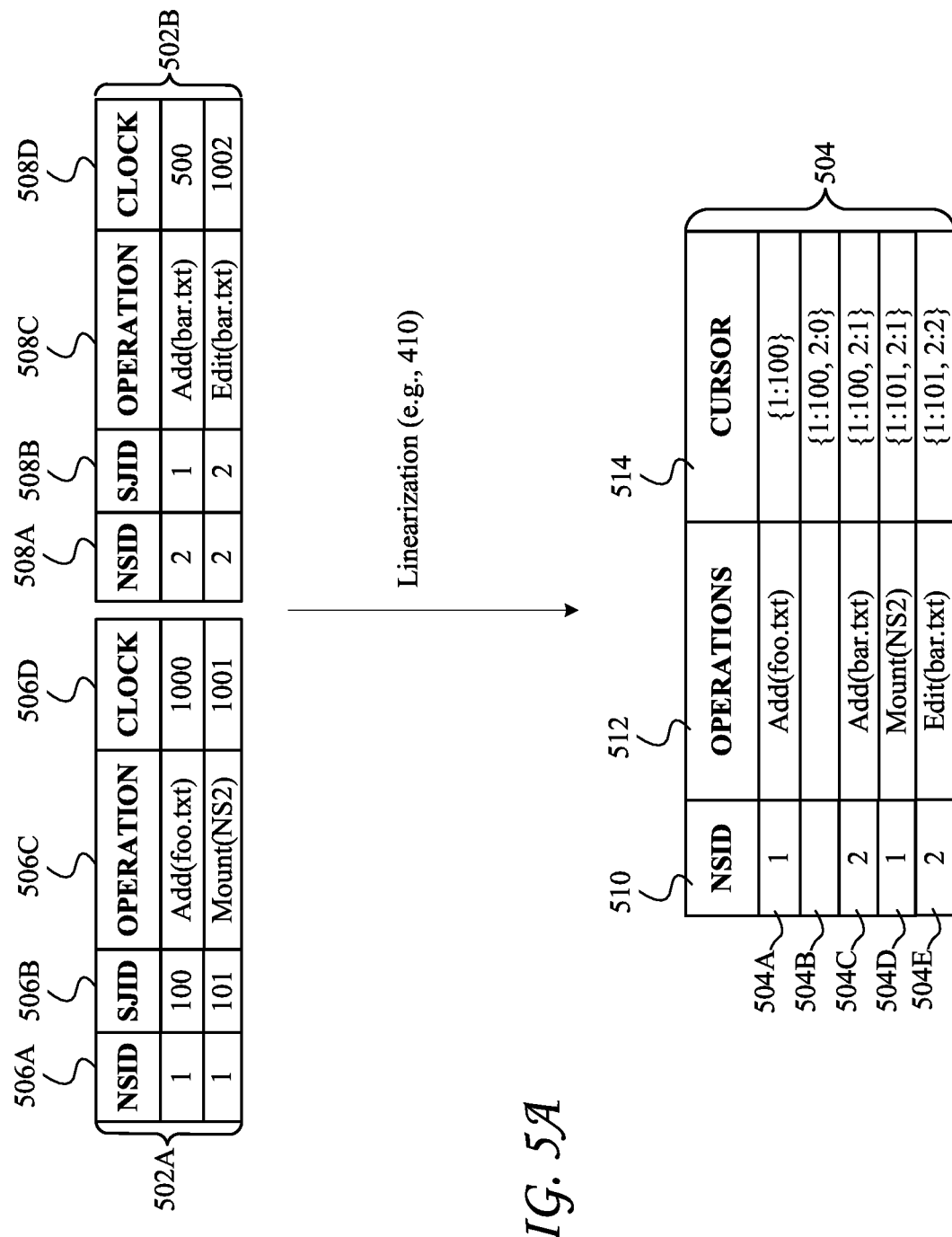
FIG. 5A shows an example linearization of cross-namespace operations.
Figure 5B:
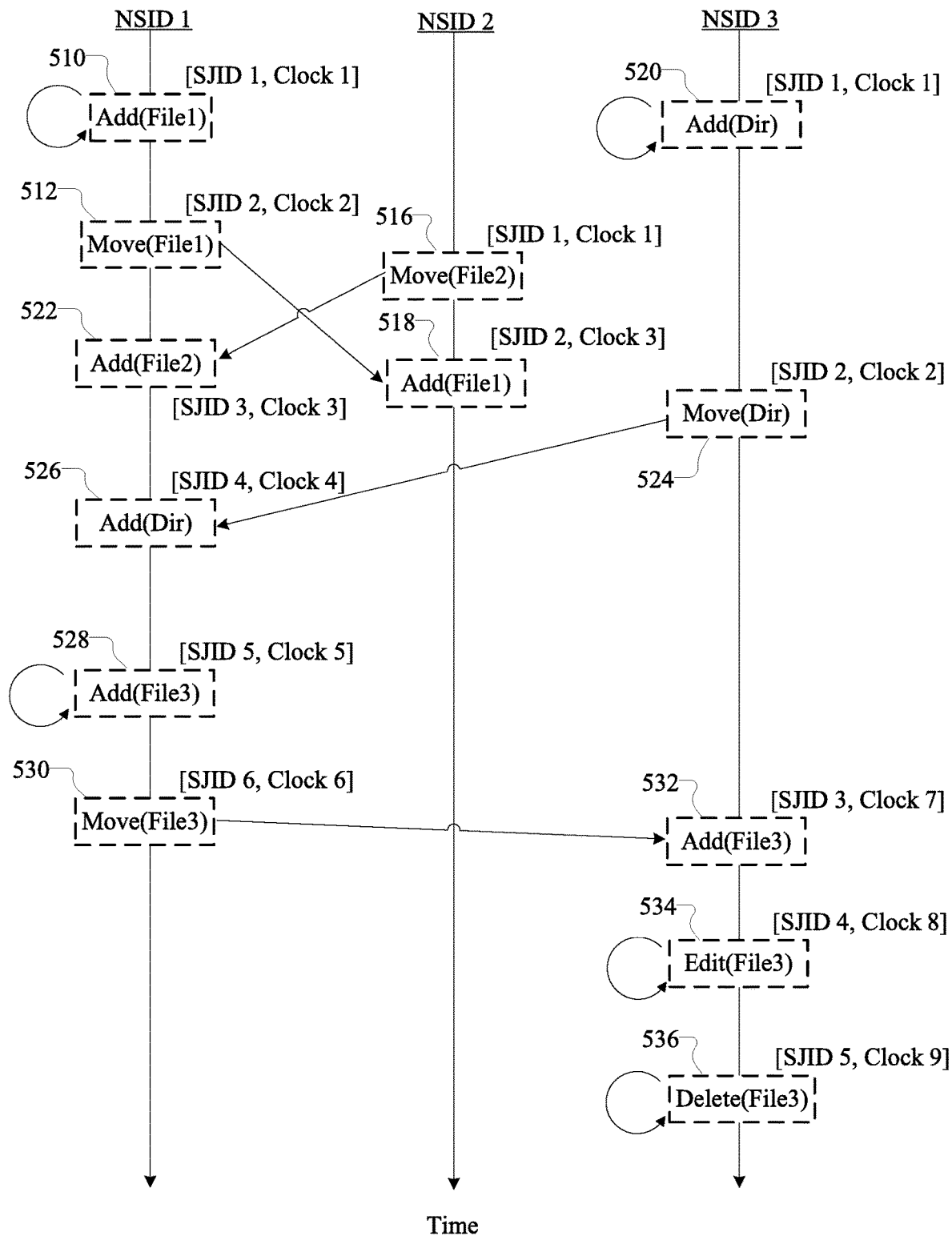
FIG. 5B shows a diagram of events across namespaces ordered according to lamport clocks calculated for the events.

FIG. 5B illustrates a diagram of an ordering of events across namespaces based on lamport clocks. In this example, various operations have been executed across namespaces NSID 1, NSID 2, and NSID 3. Each namespace maintains an SJID for every operation at that namespace in order to determine the ordering of operations within the namespace. However, the SJID of a namespace does not identify ordering and causality of operations across namespaces. Accordingly, lamport clocks are calculated for the operations in the namespaces NSID 1, 2, 3 to determine causality and obtain a cross-namespace ordering of operations.

At NSID 1, operation 510 has SJID 1 and clock 1. At NSID 2, operation 516 has SJID 1 and clock 1. At NSID, operation 520 has SJID 1 and clock 1. Operations 510, 516, 520 span multiple namespaces and do not have causal relationships. Accordingly, operations 510, 516, 520 do not affect each other's clocks.

Ordering of operations within the namespace can be determined based on the SJID at the namespace. Clocks for operations within the same namespace can simply be incremented by 1. Thus, at SJID 2 in NSID 1, the clock for operation 512 is incremented to 2.

Operation 512 in NSID 1 is a move of File1 to NSID 2. Accordingly, operation 512 triggers operation 518 at NSID 2, which is the add of File1 at NSID 2. Since operation 518 at NSID 2 is causally dependent on another operation from a different namespace, namely operation 512 from NSID 1, the clock for operation 518 is calculated based on the clock at NSID 1 and the clock at NSID 2. The algorithm can be expressed as: TargetNS_clock$_{t1}$=max(Source_NS$_{clock}$, TargetNS_clock$_{t0}$)+1. Thus, in this example, the clock for operation 518 at NSID 2 is 3 (e.g., max(2, 1)+1). Accordingly, operation 518 at NSID 2 has SJID 2 and clock 3.

Similarly, operation 516 at NSID is a move of File2 from NSID 2 to NSID 1. Operation 516 thus triggers operation 522 at NSID 1, for adding File2 at NSID 1. The clock for operation 522 is calculated based on the clock algorithm, which equals 3. Thus, operation 522 has SJID 3 at NSID 1 and clock 3.

Operation 522 at NSID 3 is causally dependent on an operation in the same namespace, namely operation 520 at NSID 3. Thus, the clock for operation 522 can be calculated by incrementing the clock of operation 520 at NSID 3. In this example, the clock for operation 522 is therefore 2. Operation 522 at NSID 3 has SJID 2 and clock 2. Since operation 522 is a move operation for moving Dir to NSID 1, operation 522 triggers operation 524 at NSID 1, adding Dir to NSID 1.

Since operation 524 is triggered by operation 522 in a different namespace (NSID 3), the clock for operation 524 is calculated based on the clock at NSID 1 and the clock for operation 522. Accordingly, the clock for operation 524 is set to 4 (e.g., max(2, 3)+1). Operation 524 thus has SJID 4 at NSID 1 and clock 4.

Operation 526 at NSID 1 adds File3 to NSID 1, and is not a cross-namespace operation. Accordingly, the clock for operation 526 is calculated by incrementing the clock at NSID 1. The clock for operation 526 is thus set to 5.

Operation 528 is causally dependent on operation 526 also within NSID 1. The clock for operation 528 is thus set to 6 by incrementing the clock of operation 526 at NSID 1. Operation 528 has SJID 6 at NSID 1 and clock 6.

Operation 528 is a move operation which moves File3 to NSID 3. Operation 528 thus triggers operation 530 at NSID 3. Since operation 530 is based on an operation from a different namespace, its clock is calculated using the clock algorithm based on the clock at NSID 3 and the clock of operation 528. In this case, the clock for operation 530 is set to 7. Operation 530 thus has SJID 3 at NSID 3 and clock 7.

Operations 532, 534 are not cross-namespace operations and are causally related to operation 530 at NSID 3. Thus, the clock for operations 532, 534 can be calculated by incrementing the clock of operation 530. In this example, the clocks for operations 532, 534 are set to 8 and 9 respectively.

Figure 6:
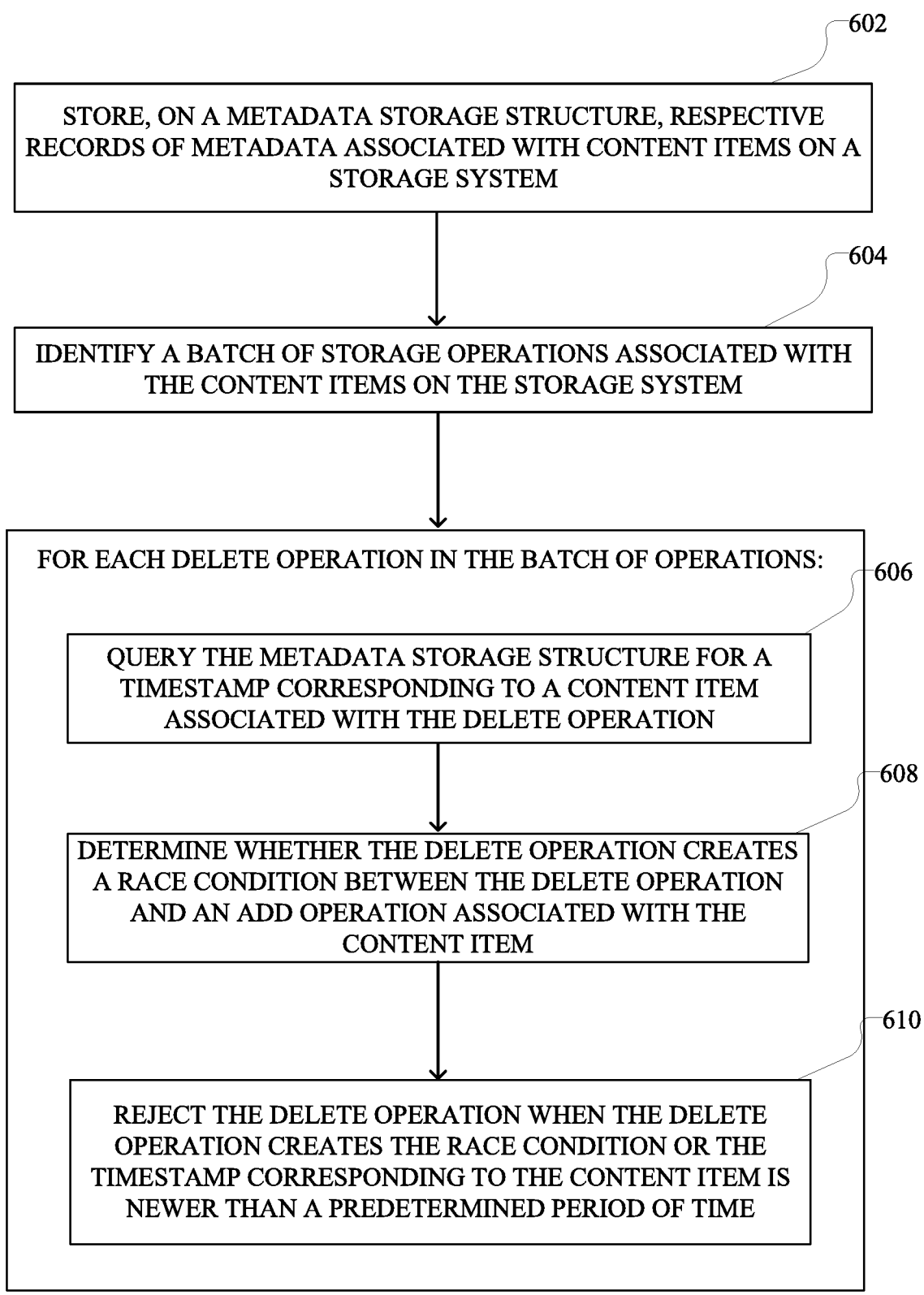
FIG. 6 shows an example method for translating managing storage operations between content storage systems.

FIG. 6 illustrates an example method for translating managing storage operations between content storage systems. At step 602, storage interface 352 stores, on a metadata storage structure (e.g., table 370), respective records (e.g., 372A, 372B) of metadata associated with content items (e.g., blocks 220A, 220B, 220C, 220N) on cloud storage 350. The respective records can include object identifiers that uniquely identify each of the content items on cloud storage 350 and timestamps associated with the content items. Storage interface 352 can store the content items on cloud storage 350 as well as content storage 142. The respective records can thus also include identifiers, such as hash values for the content items, that uniquely identify the content items on content storage 142. The respective records can thus include metadata tracking storage of the content items at cloud storage 350 as well as content storage 142.

At step 604, storage interface 352 identifies a batch of storage operations (e.g., operations 380) associated with the content items. The batch of storage operations can include one or more delete and/or put operations. For each delete operation in the batch of operations, storage interface 352 queries at step 606 the metadata storage structure (e.g., table 370) for a timestamp corresponding to a content item associated with the delete operation, determines at step 608 whether the delete operation creates a race condition between the delete operation and an add operation associated with the content item, and at step 610 rejects the delete operation when the delete operation creates the race condition or the timestamp corresponding to the content item is newer than a predetermined period of time.

For example, storage interface 352 can check the timestamp of the content item in the metadata storage structure and determine if the content item is eligible to be deleted based on a policy at content management system 110. If the content item is not eligible, storage interface 352 can reject the delete operation. If storage interface 352 detects a race condition created by a put operation for the content item as well as the delete operation for the content item, storage interface 352 can reject the delete operation since the put operation will either cause the content item to be ineligible for deletion if processed prior to the delete operation, or cause the content item to be re-added if the delete operation is processed and approved before the put operation.

If the content item is eligible for deletion based on the timestamp and storage interface 352 does not detect a race condition created by a put operation for the same content item, storage interface 352 can proceed with the delete operation. Here, storage interface 352 can delete the content item from cloud storage 350 and the record of the content item from the metadata storage structure (e.g., table 370). In some cases, storage interface 352 can lock the record of the content item in the metadata storage structure while it deletes (or requests deletion) the content item from cloud storage 350. This will prevent an intervening operation from modifying the record of the content item and modifying the content item and/or metadata associated with the content item. Storage interface 352 can delete the record of the content item after deleting the content item from cloud storage 350 to indicate that the content item is no longer stored on cloud storage 350.

Storage interface 352 can use the metadata storage structure to manage storage of content items on various storage systems (e.g., content storage 142, cloud storage 350, and/or any other storage solutions). Storage interface 352 can add metadata to the record of a content item to uniquely identify the content item at each storage system. Different storage systems may use different identifiers. Therefore, storage interface 352 can add identifiers to a content item's record as necessary based on the different identifiers to map the record of the content item to the content item on the various storage systems. Storage interface 352 can add and update timestamps for the content items and use the timestamps to avoid out of order operations at different storage systems, conflicts created from race conditions, and ensure compliance with storage policies across the different storage systems even if one or more of those storage systems themselves do not support such policies.

Figure 7:
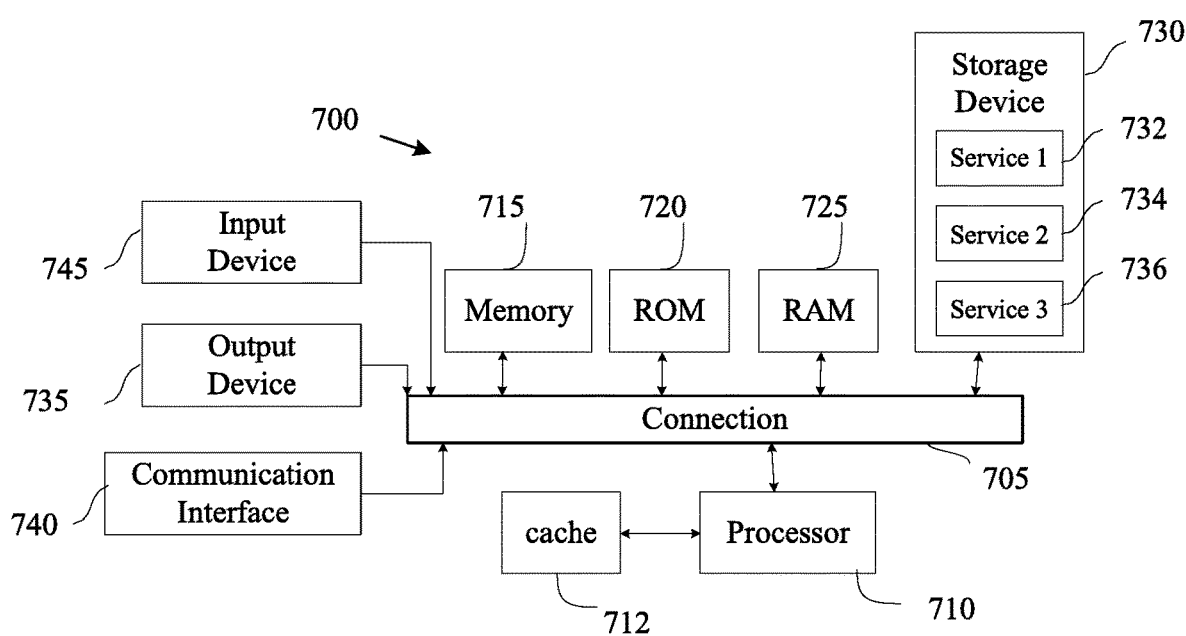
FIG. 7 shows an example of a system for implementing certain aspects of the present technology.

FIG. 7 shows an example of computing system 700, which can be for example any computing device making up client device 150, content management system 110 or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
  receiving, via a content storage interface of a content management system, from a client device, a request to download a content item from the content management system, wherein the content storage interface manages access to the content item by the client device and transmission of the content item to the client device, and wherein the request includes a valid authorization token that includes access permissions associated with the content item;
  determining by the content storage interface that the authorization token is valid based on a cryptographic signature associated with the token;
  when the request includes the valid authorization token:

sending a content item request by the content storage interface to a storage service associated with the content management system, the content item request being a request to receive the content item requested by the client device;

retrieving, by the content storage interface, the content item from storage at the content management system; and sending, by the content storage interface, the content item to the client device; and when the request does not include the valid authorization token:

sending, by the content storage interface, an authorization request to an authorization service, an authentication request including a host key associated with the client device to an authentication service, and the content item request to the storage service;

receiving a response from the authentication service indicating that a host or account associated with the client device is authenticated, the response including at least one of a host identifier corresponding to the host key or an account identifier corresponding to the host key;

receiving a response from the authorization service indicating that the host or account is authorized; and determining whether the content item is available in storage at the content management system;

when it is determined that the content item is available in storage at the content management system and that the client device is authenticated and authorized to access the content item, retrieving the content item from storage at the content management system; and sending the content item to the client device.

2. The method of claim 1, wherein determining that the authorization token is valid comprises:

identifying a first token in the request;

determining whether the first token in the request matches a second token on the content management system, the second token being associated with at least one of the client device or the content item; and determining whether the first token has expired based on an expiration period associated with the first token.

3. The method of claim 1, wherein the storage service comprises a storage index identifying content items available in storage at the content management system, wherein sending the content item request to the storage service comprises:

sending a content item lookup request to the storage index, the content item lookup request comprising data identifying the content item.

4. The method of claim 3, wherein the data identifying the content item comprises at least one of a content item identifier, a fingerprint associated with the content item, metadata associated with the content item, or one or more hash values associated with the content item, and wherein determining whether the content item is available in storage comprises:

receiving a response to the content item lookup request, the response comprising a result of a search of the content item in the storage index, the search being based on the data identifying the content item; and based on the result of the search in the response to the content item lookup request, determining whether the content item is available in storage at the content management system.

5. The method of claim 1, further comprising:

receiving, via a content management system, from a second client device, a second request to download the content item from the content management system;

determining that the second request does not include a respective valid authorization token;

based on the second request, sending a second authorization request to the authorization service, a second authentication request to the authentication service, and a second content item request to the storage service;

determining, based on at least one of the second authorization request or the second authentication request, whether the second client device is authenticated or authorized to access the content item; and sending a message to the second client device indicating whether the second client device is authenticated or authorized to access the content item.

6. The method of claim 5, wherein the message indicating whether the second client device is authenticated or authorized to access the content item is sent to the second client device prior to determining, based on the second content item request, whether the content item is available in storage at the content management system.

7. The method of claim 5, further comprising:

based on the second content item request, determining that the content item is available in storage at the content management system; and prior to retrieving the content item from storage at the content management system, sending, to the second client device, the message indicating whether the second client device is authenticated or authorized to access the content item.

8. The method of claim 1, wherein sending the content item request to the storage service comprises sending, to a storage system associated with the content management system, an operation requesting the content item from storage, wherein retrieving the content item from storage is based on the operation.

9. The method of claim 1, wherein sending the content item to the client device comprises:

streaming a first portion of the content item to the client device;

while streaming the first portion of the content item to the client device, applying one or more operations on a second portion of the content item, the one or more operations comprising at least one of a compression operation, an encryption operation, or a decompression operation, wherein the one or more operations are selected based on a download speed associated with the client device;

when streaming the first portion of the content item to the client device has completed, streaming a second portion of the content item to the client device; and while streaming the second portion of the content item to the client device, applying the one or more operations on a third portion of the content item.

10. The method of claim 1 comprising:

receiving a request to synchronize a folder at a file journal interface;

determining by the file journal interface that the client device is authorized to access the folder, wherein the folder contains the content item;

determining, by the file journal interface that the content item has been updated since a prior synchronization; and returning the valid authorization token that includes access permissions for the content item contained with the folder.

11. The method of claim 1, wherein the content item is a plurality of content items.

12. A non-transitory computer readable medium comprising instructions, the instructions, when executed by one or more processors, cause a content storage interface of a content management system to:
- receive, from a client device by the content storage interface, a request to upload a content item to the content management system wherein the content storage interface manages access to the content item by the client device and receipt of the content item from the client device;
- determine by the content storage interface whether the client device is authorized to upload the content item to the content management system, wherein the instructions to determine whether the client device is authorized includes further instructions to:
- send, by the content storage interface, an authorization request to an authorization service, an authentication request including a host key associated with the client device to an authentication service;
- receive a response from the authentication service indicating that a host or account associated with the client device is authenticated, the response including at least one of a host identifier corresponding to the host key or an account identifier corresponding to the host key;
- receive a response from the authorization service indicating that the host or account is authorized;
- after determining that the client device is authorized to upload the content item:
- send, to a storage associated with the content management system, a first instruction to store the content item; and
- send, to a storage index identifying content items available in the storage, a second instruction to store a record indicating that the content item is available in the storage, the record identifying at least one of the content item, a namespace associated with the content item, a path associated with the content item, or one or more hash values associated with the content item;
- generate an authorization token for the client device, the authorization token including access permissions associated with the content item and the client device and a cryptographic signature, wherein the access permissions indicate that the client device is authorized to access the content item from the storage; and
- send the authorization token to the client device.

13. The non-transitory computer readable medium of claim 12, wherein receiving the request to upload the content item comprises:
- sequentially receiving portions of the content item from the client device.

14. The non-transitory computer readable medium of claim 13, storing instructions that, when executed by the one or more processors, cause the content management system to:
- receive a first portion of the content item from the client device;
- while receiving a second portion of the content item from the client device, apply one or more operations on the first portion of the content item, the one or more operations comprising at least one of a compression operation, an encryption operation, or a decompression operation, wherein the one or more operations are selected based on an upload speed associated with the client device; and
- after receiving the second portion of the content item from the client device, apply the one or more operations on the second portion of the content item.

15. The non-transitory computer readable medium of claim 14, storing instructions that, when executed by the one or more processors, cause the content management system to:
- after receiving all of the portions of the content item, send all of the portions of the content item to the storage associated with the content management system along with the first instruction to store the content item.

16. The non-transitory computer readable medium of claim 14, wherein the first instruction comprises one or more store operations associated with the portions of the content item, and wherein the portions of the content item are sent to the storage after applying the one or more operations on the portions of the content item.

17. A content management system comprising:
- one or more processors; and
- at least one non-transitory computer readable medium having stored therein instructions which, when executed by the one or more processors, cause the content management system to:
- receive, via a content storage interface of the content management system, from a client device, a request to download a content item from the content management system, wherein the content storage interface manages access to the content item by the client device and transmission of the content item to the client device, and wherein the request includes a valid authorization token that includes access permissions associated with the content item;
- determine by the content storage interface that the authorization token is valid based on a cryptographic signature associated with the token;
- when the request includes the valid authorization token:
- send a content item request by the content storage interface to a storage service associated with the content management system, the content item request being a request to receive the content item requested by the client device;
- retrieve, by the content storage system, the content item from storage at the content management system; and
- send, by the content storage interface, the content item to the client device; and
- when the request does not include the valid authorization token:
- send, by the content storage interface, an authorization request to an authorization service, an authentication request including a host key associated with the client device to an authentication service, and the content item request to the storage service;
- receive a response from the authentication service indicating that a host or account associated with the client device is authenticated, the response including at least one of a host identifier corresponding to the host key or an account identifier corresponding to the host key;
- receive a response from the authorization service indicating that the host or account is authorized; and
- determine whether the content item is available in storage at the content management system;
- when it is determined that the content item is available in storage at the content management system and that the client device is authorized to access the content item, retrieve the content item from storage at the content management system; and
- send the content item to the client device.

18. The content management system of claim 17, wherein the storage service comprises a storage index identifying content items available in storage at the content management system, wherein sending the content item request to the storage service comprises:

sending a content item lookup request to the storage index, the content item lookup request comprising data identifying the content item.

19. The content management system of claim 18, wherein the data identifying the content item comprises a content item identifier, and wherein determining whether the content item is available in storage comprises:

receiving a response to the content item lookup request, the response comprising a result of a search of the content item in the storage index, the search being based on the data identifying the content item; and based on the result of the search in the response to the content item lookup request, determining whether the content item is available in storage at the content management system.

20. The content management system of claim 17, the at least one non-transitory computer readable medium storing instructions which, when executed by the one or more processors, cause the content management system to:

receive, from a second client device, a second request to download the content item from the content management system;

determine that the second request does not include a respective valid authorization token;

based on the second request, send a second authorization request to the authorization service, a second authentication request to the authentication service, and a second content item request to the storage service;

determine, based on at least one of the second authorization request or the second authentication request, whether the second client device is authenticated or authorized to access the content item; and send a message to the second client device indicating whether the second client device is authenticated or authorized to access the content item.

21. The content management system of claim 20, wherein the message indicating whether the second client device is authenticated or authorized to access the content item is sent to the second client device prior to at least one of:

determining, based on the second content item request, whether the content item is available in storage at the content management system; or retrieving the content item from storage at the content management system.

* * * * *